US012620894B2

(12) United States Patent
Chen et al.

(10) Patent No.: US 12,620,894 B2
(45) Date of Patent: May 5, 2026

(54) MAXIMUM FREQUENCY ADJUSTMENT CONTROL FOR A SWITCHED CAPACITOR POWER CONVERTER

(71) Applicant: Intel Corporation, Santa Clara, CA (US)

(72) Inventors: Keng Chen, Acton, MA (US); Huanhuan Zhang, Ashland, MA (US); Arvind Raghavan, Lexington, MA (US); Tamir Salus, Zichron Yaakov (IL); Christopher Schaef, Hillsboro, OR (US); Gayathri Devi Sridharan, Northborough, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/983,708

(22) Filed: Nov. 9, 2022

(65) Prior Publication Data

US 2024/0154526 A1     May 9, 2024

(51) Int. Cl.
$\begin{array}{lll} H02M\ 3/06 & & (2006.01) \\ H02M\ 1/00 & & (2006.01) \end{array}$

(52) U.S. Cl.
CPC ........... *H02M 3/06* (2013.01); *H02M 1/0009* (2021.05)

(58) Field of Classification Search
CPC .............................. H02M 3/06; H02M 1/0009
USPC ........................................................ 323/234
See application file for complete search history.

(56) References Cited

U.S. PATENT DOCUMENTS

| | | | |
|---|---|---|---|
| 11,418,119 B2 * | 8/2022 | Xie ..................... | H02M 3/1582 |
| 2018/0102767 A1 * | 4/2018 | Hsieh ................ | H03K 5/00006 |

OTHER PUBLICATIONS

"2nd Generation Intel Core Processor Family Mobile with ECC", Datasheet Addendum, May 2012, 42 pgs.
"Intel Celeron P4000 and U3000 Mobile Processor Series", External Design Specification—vol. One, Mar. 2010, 202 pgs.
"Multi-Core Processors Market Will Touch USD 110.8 Billion by 2025 at a 17.7% CAGR—Report by Market Research Future (MRFR)", <https://www.globenewswire.com/fr/news-release/2021/06/30/2255940/0/en/Multi-Core-Processors-Market-Will-Touch-USD-110-8-Billion-by-2025-at-a-17-7-CAGR-Report-by-Market-Research-Future-MRFR.html> Jun. 30, 2021.
Andersen, Toke M., et al., "A 10 W On-Chip Switched Capacitor Voltage Regulator With Feedforward Regulation Capability for Granular Microprocessor Power Delivery", IEEE Transactions on Power Electronics, vol. 32, No. 1, Jan. 2017, 16 pgs.
Furber, Steve , "Microprocessors: the engines of the digital age", Proc. R. Soc. A 473: 20160893, 2017, 12 pgs.

(Continued)

*Primary Examiner* — Yemane Mehari
(74) *Attorney, Agent, or Firm* — NICHOLSON DE VOS WEBSTER & ELLIOTT LLP

(57) ABSTRACT

A device comprises a first comparator to generate a first clock signal based on a reference voltage and a first voltage at an output of a switched-capacitor power converter (SCPC), and a second comparator to generate a first control signal based on the first voltage and a threshold voltage. A sensor is to generate a second control signal based on one of a level of a current of the first clock signal, or a duty cycle of the first clock signal. A frequency divider circuit is to generate a second clock signal based on the first control signal and the second control signal, and in some embodiments, further based on one of the first clock signal or a third clock signal. Controller circuitry is to operate switch circuitry of the SCPC based on the first clock signal.

20 Claims, 9 Drawing Sheets

(56) References Cited

OTHER PUBLICATIONS

Jain, Rinkle , et al., "Conductance Modulation Techniques in Switched-Capacitor DC-DC Converter for Maximum-Efficiency Tracking and Ripple Mitigation in 22nm Tri-gate CMOS", Proc. IEEE CICC, 2014, 4 pgs.

Liang, Xiaoguo, et al., "One Novel Remote Sensing method for on-board Voltage Regulator in Computing System", IEEE Energy Conversion Cong. and Expo. (ECEE), Sep. 2012, pp. 345-350.

Shilov, Anton, "842 Chips Per Second: 6.7 Billion Arm-Based Chips Produced in Q4 2020", <https://www.tomshardware.com/news/arm-6-7-billion-chips-per-quarter> Feb. 13, 2021.

* cited by examiner

MAXIMUM FREQUENCY ADJUSTMENT CONTROL FOR A SWITCHED CAPACITOR POWER CONVERTER

BACKGROUND

1. Technical Field

This disclosure generally relates to power converter circuitry and more particularly, but not exclusively, to adjusting the maximum frequency used to control a frequency-controlled switched-capacitor power converter.

2. Background Art

A switched-capacitor power converter (SCPC) is one type of voltage regulator technology which provides space and cost efficiencies due to its primary reliance on using only capacitors and switch circuitry. As a result of the switching process, the output voltage of an SCPC can have a periodic variation or "ripple." Keeping ripple low and providing high conversion efficiency in SCPCs is important.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
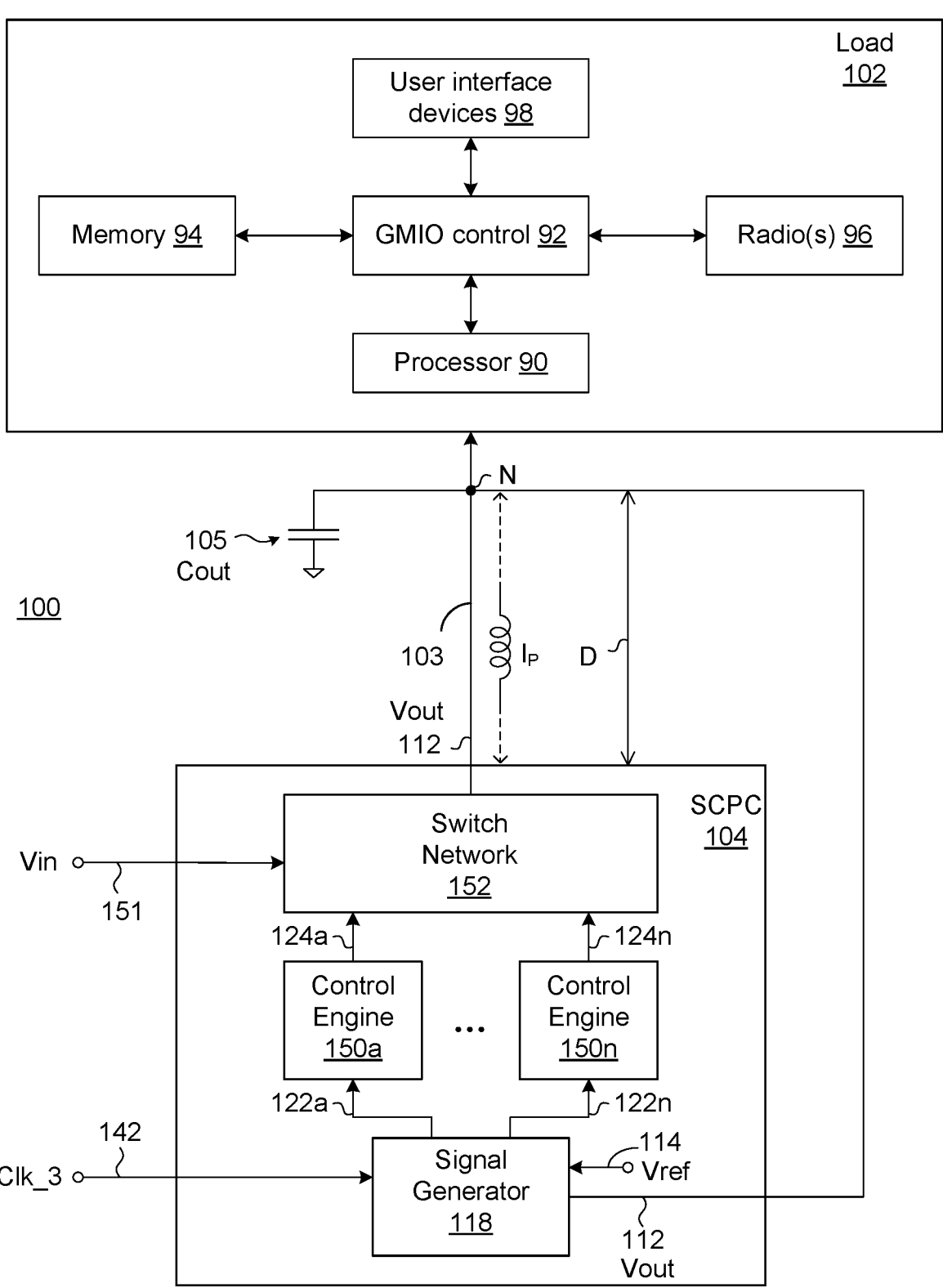
FIG. 1 shows a functional block diagram illustrating features of a system to provide a regulated voltage in which a frequency of a clock signal used to provide the voltage is adjusted based on a load condition according to an embodiment.

FIG. 1 shows features of a system 100 to provide a regulated voltage according to various embodiments. System 100 illustrates one example of an embodiment wherein a regulated voltage is provided to a load with a switched-capacitor power converter circuit, wherein a load condition is detected and a maximum frequency used by a signal generator is adjusted based on the detected load condition.

As shown in FIG. 1, system 100 comprises a switched-capacitor power converter (SCPC) 104 that provides an output voltage Vout 112 to a "load" 102 via a trace or copper pour 103. The system 100 may include an output capacitor Cout 105, for example, to reduce ripple in Vout 112. SCPC 104 is separated from load 102 by a distance D corresponding with a length of trace 103 between SCPC 104 and the target load 102. In some implementations, the distance D may be of sufficient length that performance is affected. For example, in a system-on-a-chip (SoC), the distance D from SCPC 104 to one or more components of a load 102 may be such that parasitic inductance $I_P$ of the trace 103 is relatively large. This relatively large inductance, together with the capacitance of output capacitor Cout (or other capacitance), can cause relatively large voltage ringing at node N proximate or near to load 102. SCPC 104 may monitors load conditions, e.g., Vout 112, at node N, or at any other suitable point along trace 103.

Ringing of Vout 112 at a monitoring point may be not be a serious problem under heavy load conditions, i.e., when the amount of current supplied by SCPC 104 is relatively large. However, during light load conditions, large voltage ringing may cause large output voltage ripple and may significantly reduce the efficiency of SCPC 104. An advantage of various embodiments is that SCPC 104 monitors load conditions and adjusts the maximum switching frequency of a clock signal input to a feedback comparator, which reduces output voltage ripple and improves efficiency under light load conditions. In SCPC 104, a feedback comparator monitors a load condition. The feedback comparator receives a clock signal having a maximum switching frequency and sends a pulse to control circuitry when Vout 112 falls below a reference voltage. Because the clock signal supplied to the feedback comparator can have a relatively high frequency, when the feedback comparator detects ringing on Vout 112, it can trigger a large number of pulses in a short period of time. As a result, under light load conditions, SCPC 104 can supply more charge than the load requires, resulting in ripple on Vout 112. In addition, conversion efficiency is less than what it would otherwise be without the voltage ringing.

In the example of FIG. 1, the load 102 comprises one or more processors 90, a graphics/memory/input/output (GMIO) control 92, a memory 94, a wireless interface/radio 96, and user interface devices 98. For example, system 100 comprises some or all of a computing platform such as that of a test system, design/debug tool, laptop, server, wireless smart phone, media player, imaging device, or any other suitable apparatus. One or more components of the load 102 are to receive power from voltage regulator (VR) circuitry, such as that of the illustrative switched-capacitor power converter SCPC 104 shown.

Load 102 is coupled, via a trace or copper pour 103, to receive output voltage Vout 112 generated by the SCPC 104 of system 100. However, the output voltage Vout may be coupled with a particular one or more individual components of load 102, e.g., processor 90, memory 94, etc. In various embodiments, SCPC 104 provides power to any of various additional or alternative components of load 102. As mentioned, output capacitor Cout 105 may be coupled with Vout 112.

In the example of FIG. 1, processor 90 is coupled to memory 94, radios 96, and user interface devices 98 through GMIO control 92. GMIO control 92 includes one or more blocks (e.g., chips or units within an integrated circuit) to perform various interface control functions (e.g., memory control, graphics control, I/O interface control, and the like). These circuits are implemented, for example, on one or more separate chips, and/or are partially or wholly implemented within a chip comprising processor 90. In various embodiments, all or part of SCPC 104 is alternatively implemented within processor 90 or within any of various other such components of system 100. In some embodiments, load 102 and SCPC are implemented in a single IC device, e.g., a SoC.

In some embodiments, memory 94 comprises one or more memory blocks to provide additional RAM to the processor 90. Memory 94 may be implemented, for example, with any suitable memory including but not limited to dynamic RAM (DRAM), static RAM (SRAM), flash memory, or the like. In an embodiment, radios 96 wirelessly couple processor 90 to a wireless network (not shown). In some embodiments, user interface devices 98 include one or more devices such as a display, keypad, mouse, etc. to allow a user to interact with and perceive information from the system 100.

The illustrated SCPC 104 comprises a switch network 152, which includes multiple circuits—referred to herein as "converter cores" (or, for brevity, simply "cores")— which are coupled in parallel with each other, and which are to function as a switched-capacitor (SC) DC-DC converter. In one such embodiment, a DC input voltage signal/level/ potential Vin 151 is received, for example, from a battery (not shown) or other rail source that is included in—or alternatively, is to couple to—system 100. Based on the received input voltage Vin, the switch network 152 generate an output voltage Vout 112, which various components of load 102 uses during operation of system 100—e.g., to perform various computing tasks.

By way of illustration and not limitation, switch network 152 comprises multiple converter cores. Each core may receive an input voltage Vin 151 and provide an output voltage Vout 112. In some embodiments, the convertor cores may operate in combination with each other to generate a single voltage Vout based on voltage Vin. For instance, in the example shown in FIG. 1, switch network 152 provides a single Vout 112 to load 102. In other embodiments, switch network 152 may provide multiple instances of Vout 112 to respective different components of load 102.

By way of illustration and not limitation, each converter core of switch network 152 comprises at least one capacitor and switch circuits. For example, a core of switch network 152 comprises switches which are variously coupled between Vin 151 and Vout 112 and terminals of a capacitor.

In various embodiments, SCPC 104 includes—or alternatively, accommodates coupling to—circuitry (such as that of the illustrative control engines 150a, . . . 150n shown) which generate one or more control signals 124a, . . . , 124n, which variously operate switch circuitry within switch network 152. For example, the control signals 124a, . . . , 124n determine which switches will be opened and which switches will be closed at a particular time. The control signals 124a, . . . , 124n determine a sequential transitioning of a given one of cores in switch network 152 between various switch states or phases. In some embodiments, some or all of control signals 124a, . . . , 124n are generated based on first clock signal 122a, . . . 122n.

To facilitate efficient voltage regulation according to some embodiments, SCPC 104 may be configured to operate in any one of multiple available modes. While operating in a particular mode, control engines 150a, . . . 150n use some or all of control signals 124a, 124n to variously transition one or more cores in switch network 152 through a respective sequence of switch states.

In various embodiments, SCPC 104 includes—or alternatively, accommodates coupling to—circuitry (such as that of the illustrative signal generator 118 shown) which generates one or more first clock signals 122a, . . . 122n to operate control engines 150a, . . . 150n. The signal generator 118 receives or otherwise detects output voltage Vout 112 at a node N. In addition, the signal generator 118 receives a clock signal Clk_3, 142 and a reference voltage Vref. In some embodiments, some or all of first clock signals 122a, . . . 122n are generated based on the output voltage Vout 112 and a reference voltage Vref 114, e.g., based on a comparison of Vout with Vref. In embodiments, the first clock signals 122a, . . . 122n indicate a difference between output voltage Vout 112 and a reference voltage Vref 114. For example, a state transition of first clock signals 122a, . . . 122n indicates a transition of output voltage Vout 112 above (or below) the level of reference voltage Vref 114. In various embodiments, some or all of first clock signals 122a, . . . 122n are further generated based on a clock signal Clk_3, 142.

Figure 2:
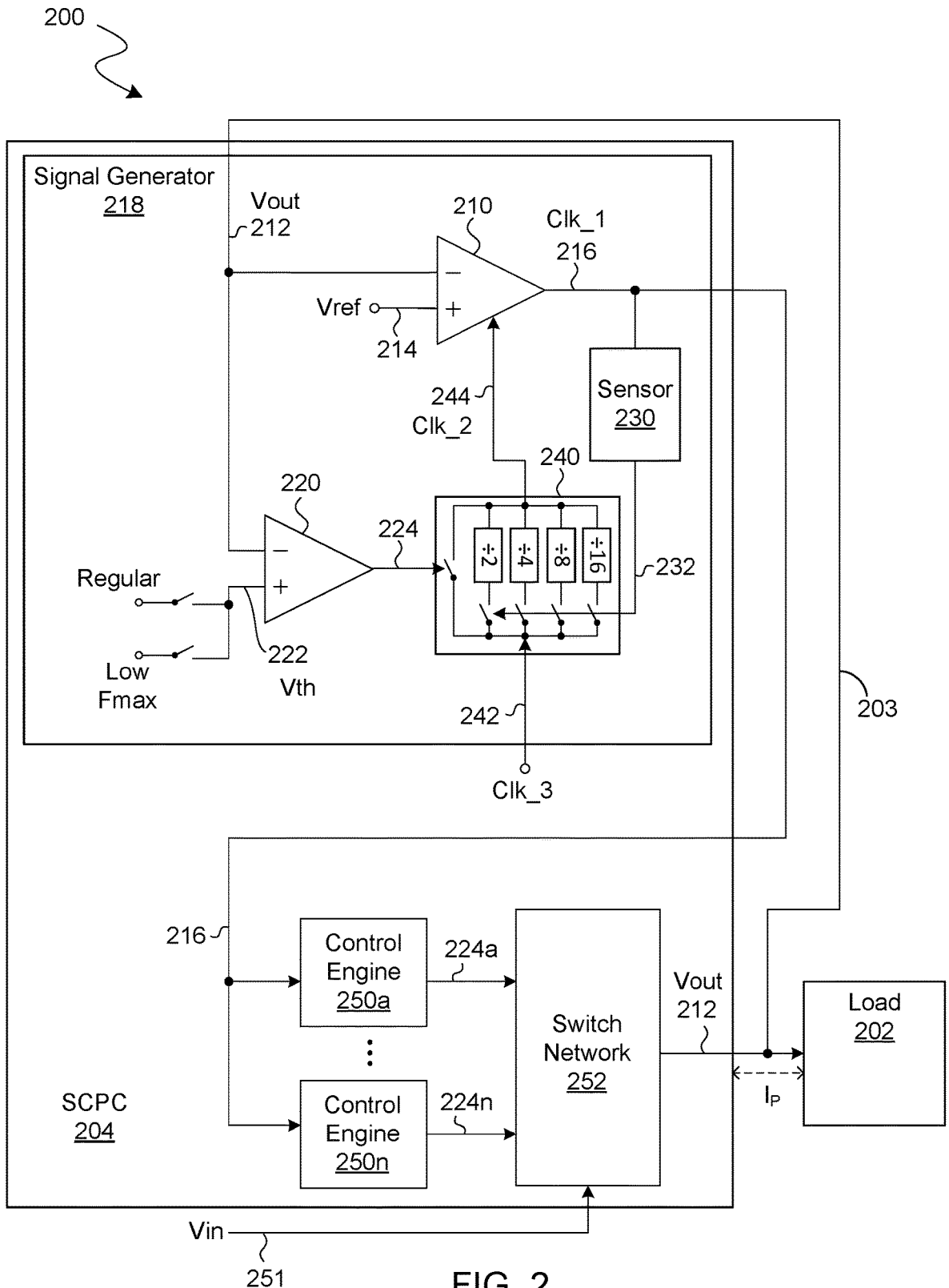
FIG. 2 shows a functional block diagram illustrating features of a system to provide a regulated voltage in which a frequency of a clock signal used to provide the voltage is adjusted based on a load condition according to an embodiment.

FIG. 2 shows features of a system comprising an SCPC having a signal generator that adjusts a maximum switching frequency used to provide a regulated voltage based on a detected load condition according to various embodiments. The SCPC 204 comprises two mechanisms for adjusting a frequency of the first clock signal that are referred to, for convenience of reference, as "slow control" and "fast control" modes.

The system 200 includes SCPC 204 that receives an input voltage Vin 251 and provides an output voltage Vout 212 to a load 202 via a trace 203. In some embodiments, a distance or length of trace 203 (which conducts Vout) between SCPC 204 and one or more components of a load 202 may be such that parasitic inductance $I_P$ of the trace 203 is relatively large. The system 200 may include an output capacitor Cout (not shown). As mentioned, the parasitic inductance together with the capacitance can result in voltage ringing.

The SCPC 204 includes signal generator 218, control engines 250a, . . . 250n, and switch network 252. The signal generator 218 generates an output Clk_1, 216, which is provided to the one of more control engines 250a, . . . 250n. The one or more control engines 250a, . . . 250n receive output Clk_1, 216 and are coupled with the switch network 252 comprising at least one capacitor and switch circuitry. The control engines 250a, . . . 250n use output Clk_1, 216 to generate control signals 224a, . . . , 224n, which variously operate switch circuitry within switch network 252. The control signals 224a, . . . , 224n cause switch network 252 to transition through a sequence of switch states that cause charge to be delivered to load 202.

The signal generator 218 comprises a first comparator 210, which may also be referred to as a feedback comparator, a second comparator 220, sensor 230, and frequency divider circuitry 240. First comparator 210 is coupled with Vout 212, reference voltage Vref, 214, and Clk_2, 244, and generates first clock signal Clk_1, 216. The one or more control engines 250a, . . . 250n are coupled with first comparator 210 and receive output Clk_1, 216. The second comparator 220 is coupled with Vout 212, and threshold voltage Vth 222, and generates a first control signal 224. The output of the second comparator 220 is coupled with the frequency divider circuitry 240, which receives the first control signal 224. The sensor 230 is coupled with the feedback comparator 210 to receive the first clock signal Clk_1, 216. The sensor 230 is also coupled with the frequency divider circuitry 240 to provide it with a second control signal 232. The frequency divider circuitry 240 generates a second clock signal Clk_2 144 that is input to frequency divider circuitry 240.

In the example of FIG. 2, the slow control mechanism comprises the sensor 230 and the frequency divider circuitry 240. The sensor 230 monitors the first clock signal and generates the second control signal 232. The second control signal 232 is used to control frequency divider circuitry, which adjusts the second clock signal 244 provided to the first comparator 210. The second control signal 232 is based on a level of a current output by the SCPC (or other voltage regulator). In the example of FIG. 2, the fast control mechanism comprises the second comparator 220 and the frequency divider circuitry 240. The second comparator 220 monitors the output voltage of the SCPC. The second comparator generates the first control signal for exiting the slow control mode and adjusting the second clock signal 244 provided to the first comparator 210 when an under-voltage condition is detected.

The frequency divider circuitry 240 receives a third clock signal Clk_3 242, and outputs the second clock signal Clk_2 244 which may be a maximum switching frequency. Frequency divider circuitry 240 comprises one or more selectable instances of frequency divider circuitry. In one embodiment, frequency divider circuitry 240 comprises divide-by-2 circuitry, divide-by-4 circuitry, divide-by-8 circuitry, and divide-by-16 circuitry. Additional or fewer instances of frequency divider circuits, and divisors other than the example divisors may be provided in various embodiments. The second control signal 232 is used by frequency divider circuitry 240 to select a particular one of the frequency divide-by circuitries. When particular frequency divide-by circuitry is selected it divides the third clock signal Clk_3 242 and outputs the second clock signal Clk_2 244, which is a divided down version of the third clock signal. The frequency divider circuitry 240 also comprises bypass circuitry that bypasses all instances of divider circuitry. The first control signal 224 is used by frequency divider circuitry 240 to select the bypass circuitry. When the bypass circuitry is selected, the third clock signal Clk_3 242 is output as second clock signal Clk_2 244.

In operation, first comparator 210 compares Vout 212 with reference voltage Vref, 214 at each clock cycle of Clk_2 244 which may be a maximum switching frequency. In various embodiments, the frequency Clk_3 242 is relatively high. In one embodiment, the frequency Clk_3 242 is 1 GHz. As long as Vout 212 is greater than reference voltage Vref, 214, switching cycles are skipped and the switching frequency is less than the maximum switching frequency. However, when Vout 212 is greater than reference voltage Vref 214, a pulse is transmitted to control engine 250, which enables a charge transfer to the load 202. If the parasitic inductance $I_P$ of the trace 203 is relatively large, first comparator 210 may detect ringing on Vout 112 and pass numerous pulses to the control engine(s) 250. Under heavy load conditions, a large number of pulses may not adversely result in output voltage ripple. In contrast, under light load conditions, many more pulses may be passed than needed, resulting in relatively high ripple on Vout 112.

The sensor 230 monitors output first clock signal Clk_1, 216 generated by feedback comparator 210 to determine the quantity of current being supplied to load 202 at various times. By monitoring output current, sensor 230 can detect the state of the load (e.g., heavy or light). Based on the detected load, sensor 230 can determined if the maximum switching frequency, e.g., the second clock signal Clk_2 244, should be reduced. By reducing the second clock signal Clk_2 244 for loads lighter than a maximum load, first comparator 210 may still detect ringing on Vout 112, but will pass fewer pulses to control engine 250 in a given time period. As an example, the frequency of third clock signal Clk_3 242 may be 1 GHz and sensor 230 detects a load at a particular time for which a maximum switching frequency of 125 MHz is appropriate. Sensor 230, via second control signal 232, causes divide-by-8 circuitry to be selected. If sensor 230 detects a load at a subsequent time for which a switching frequency of 250 MHz is appropriate, it can use second control signal 232 to cause divide-by-4 circuitry to be selected.

The second comparator 220 detects when Vout 112 falls below an output voltage threshold. For example, second comparator 220 may detect when a state of the load is heavy. Second comparator 220 compares Vout 212 with threshold voltage Vth 222. In various embodiments, the threshold voltage Vth 222 is equal to or otherwise indicative of an amount of voltage required by load 202. If Vout 212 is less than the threshold voltage Vth 222, second comparator 220 generates a first control signal 224 to control the bypass circuitry of frequency divider circuitry 240. In response to receiving first control signal 224, frequency divider circuitry 240 bypasses all instances of divider circuitry, exiting slow control mode. When second comparator 220 detects a state of the load is heavy and generates a first control signal 224, the third clock signal Clk_3 242 is output as the second clock signal Clk_2 244 to first comparator 210. By providing the third clock signal Clk_3 242 to first comparator 210, SCPC is able to transfer charge to the load 202 at its highest rate. In various embodiments, threshold voltage Vth 222 may be selectively set to one of two or more voltages, e.g., a "regular" voltage and a "low Fmax" voltage. This permits the sensitivity with which the second comparator 220 will cause the slow control mode to be exited.

As described above, the signal generator 218 can adjust a maximum switching frequency based on a detected load condition in two ways. First, in slow control mode, the frequency of clock signal Clk_2 244 may be adjusted by frequency divider circuitry 240 in response to a first control signal 224 from sensor 230. In this first mechanism, the frequency of clock signal Clk_2 244 may be adjusted up or down, and may be set to a variety of different frequencies. One aspect to the first technique is that it can involve a latency or delay before the adjustment is made. The frequency of clock signal Clk_2 244 may be adjusted in steps and each step requires a time interval. For example, a transition from a slow speed, e.g., divide-by-16, to the maximum switching frequency of SCPC 204 (third clock signal Clk_3 242) requires stepping up through divide-by-8, divide-by-4, and divide-by-2 stages. In addition, a time interval is required for sensor 230 to detect the state of the load. In contrast, in fast control mode, the frequency of clock signal Clk_2 244 is adjusted to the maximum switching frequency of SCPC 204 (third clock signal Clk_3 242) with less latency than the slow control mechanism. The frequency of second clock signal Clk_2 244 is adjusted in a single step. In addition, the second comparator 220 may detect a heavy load condition faster than sensor 230 can detect the state of the load. In various embodiments, sensor 230 may employ a pulse counting or a duty cycle detection mechanism. The pulse counting mechanism is described first.

Figures 3, 4:
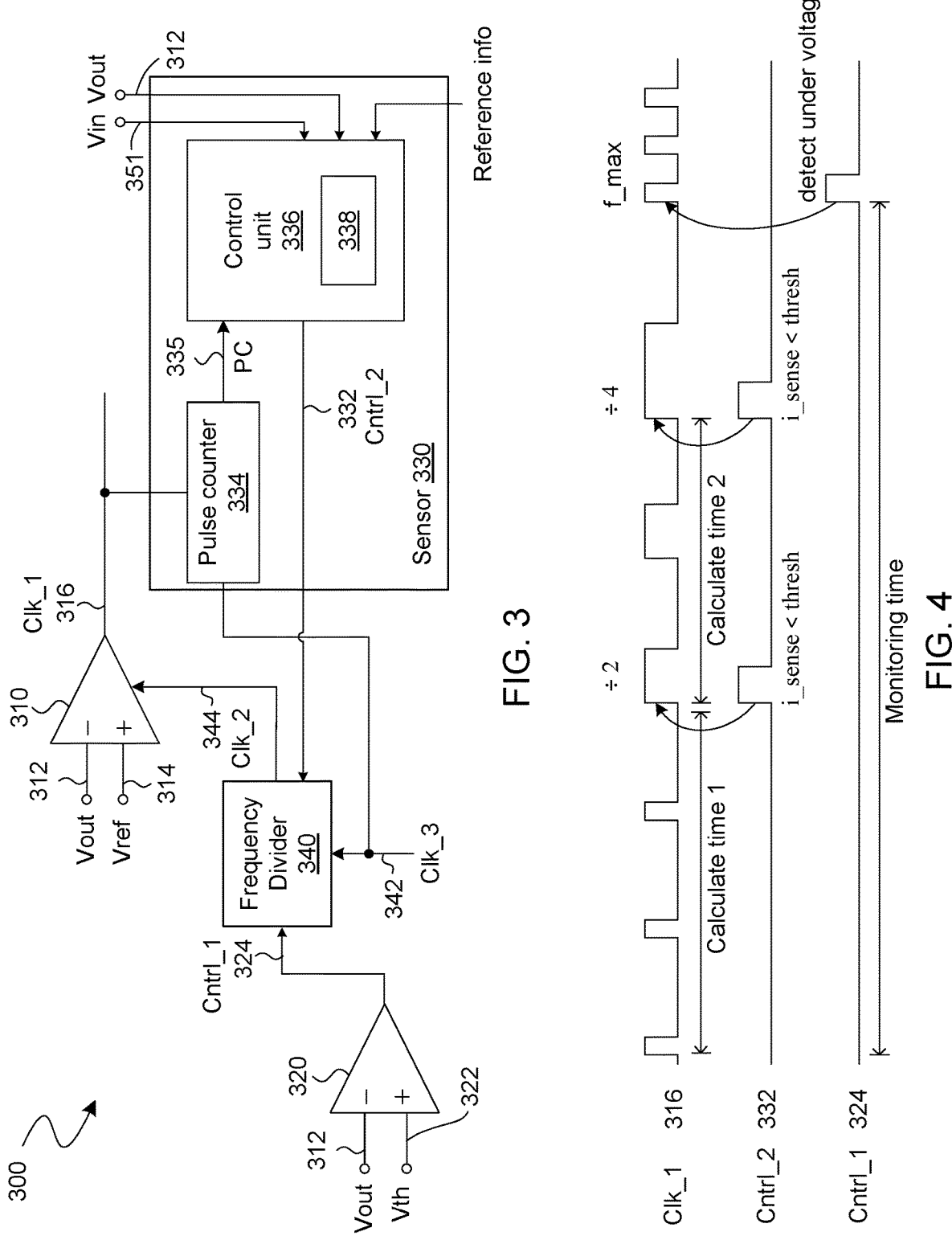
FIG. 3 shows a functional block diagram illustrating features of a signal generator for adjusting a frequency of a clock signal based on a load condition in which the load condition is detected based on a clock signal output by a feedback comparator using a pulse counting mechanism according to some embodiments.
FIG. 4 shows a timing diagram illustrating features of operations by the signal generator of FIG. 3 according to an embodiment.

FIG. 3 shows features of a signal generator for detecting a load condition based on a first clock signal output by a feedback comparator using a pulse counting mechanism according to some embodiments. In the example of FIG. 3, the signal generator provides a control signal as an output that is used to control frequency divider circuitry, which provides a clock signal to the feedback comparator. This pulse counting detection mechanism may be employed in slow control mode. The control signal is based on a level of a current output by an SCPC (or other voltage regulator), which is determined by the sensor. The signal generator comprises a pulse counter unit and a control unit. The pulse counter unit detects a clock signal, which identifies a rate of switch events of a switch network of the SCPC during a particular time period. The control unit receives a pulse count for the time period, and generates a control signal based on both the pulse count during the time period, and reference information previously provided to the control unit. The reference information specifies or otherwise indicates a function according to which an output current, conducted by the SCPC, varies based on one or more operational characteristics of the SCPC. The control signal is based on a determined amount of current drawn by a load during a time period. FIG. 3 also shows features of a second mechanism of an SCPC for unlocking or exiting a slow control mode when an under-voltage condition at the output of the SCPC is detected.

In the embodiment shown in FIG. 3, signal generator 300 of an SCPC comprises a first comparator 310, a second comparator 320, a sensor 330, and a frequency divider 340. The SCPC 300 also includes, one or more control engines and a switch network, which are not shown in FIG. 3. The control engines and switch network may be similar to those shown in FIG. 2. First comparator 310 accommodates coupling to receive or otherwise detect an output voltage Vout 312 from the SCPC 300. First comparator 310 samples Vout 312 at times synchronized with second clock signal Clk_2 344, which may be a periodic signal output from frequency divider 340. The first comparator 310 generates a first clock signal Clk_1 316 which indicates (for example) when a sampled instance of voltage Vout is less than a reference voltage level Vref 314.

The second comparator 320 detects when Vout 312 falls below an output voltage threshold 322. In various embodiments, the threshold voltage Vth 322 is equal to or otherwise indicative of an amount of voltage required by a corresponding load. For example, second comparator 320 may detect when a state of the load is heavy. Second comparator 320 compares Vout 312 with threshold voltage Vth 322. If Vout 312 is less than threshold voltage Vth 322, second comparator 320 generates a first control signal 324 to control the bypass circuitry of frequency divider circuitry 340 to bypasses all instances of divider circuitry. When second comparator 320 generates a first control signal 324, the third clock signal Clk_3 342 is output as second clock signal Clk_2 344 to first comparator 310. By providing the third clock signal Clk_3 342 to first comparator 310, SCPC is able to transfer charge to a load at its highest rate. In various embodiments, threshold voltage Vth 322 may be selectively set to one of two or more voltages.

Pulse counter 334 receives both the first clock signal Clk_1 316 and the third clock signal Clk_3 342. The third clock signal Clk_3 342, which may be the highest switching frequency available in the SCPC, e.g., 1 GHz, is also input to frequency divider 340. Based on the first clock signal Clk_1 316 and the third clock signal Clk_3 342, the pulse counter 334 generates a PC (pulse count) signal 335, which identifies or may be used to identify a number of pulses in a particular period of time. Each pulse of the PC signal 335 may correspond with a switch cycle of the switch network that, in turn, corresponds with a transfer of a certain amount of charge to a load at Vout 312. In various embodiments, the PC signal 335 identifies or may be used to identify a number of occurrences that voltage Vout 312 is detected by first comparator 310 to be less than reference voltage level Vref 314 in a particular period of time. In an embodiment, PC signal 335 is based on the first clock signal Clk_1 316.

Control unit 336 of sensor 330 comprises circuitry for executing machine-readable instructions, such as a programmable gate array, application-specific integrated circuit, microprocessor, digital logic circuitry, or other suitable circuitry. In addition, control unit 336 may comprise a memory 338 for storing machine-readable instructions, configuration parameters, one or more coefficients and/or other parameters of a function for calculating a current level based on PC signal 335 and one or more other operational characteristics. In an embodiment, memory 338 may store one or more lookup tables to store various predetermined values for one of one or more equations representing the current as a function of the one or more operational characteristics.

Control unit 336 is coupled to receive PC signal 335 from pulse counter 334 and is further coupled to receive additional information for use in determining, based on signal PC signal 335, a level of a current of the first clock signal or a level of a current conducted by the SCPC 300. In an embodiment, the level of current of the first clock signal corresponds with or may be used to determine the level of a current conducted by the SCPC 300. In an embodiment, control unit 336 receives output voltage Vout 312, an input voltage Vin 351 with which the SCPC 300 generates Vout 312, and various reference information. Examples of reference information include parameters defining an operational mode of the SCPC 300, e.g., buck or boost mode, a slope of a function for determining a quantity of charge transferred, or a sequence of switch states.

In an embodiment, current is determined by control unit 336 as a function of a rate of pulses, an input voltage provided to the SCPC 300, an output voltage generated by the SCPC 300, a capacitance of switch network, and/or other operational characteristics. Each pulse of the PC signal 335 corresponds with a transfer of charge to a load at Vout 312. Control unit 336 uses the value of a charge storage device, e.g., a capacitor, in the switch network to determine the quantity of charge per pulse, and based on the number of pulses in a particular time period, to determine the quantity of charge transferred in that period. By way of illustration and not limitation, a function for determining a quantity of charge transferred per period comprises a product of each of the rate of pulses or switch events, a capacitance of a switch network, the input voltage, and the output voltage.

FIG. 4 is a timing diagram illustrating an example of signal generator 300 in operation. Initially, pulse counter 334 receives first clock signal Clk_1 316 during a first "calculate" time period. The length of the "calculate" time period may be determined using third clock signal Clk_3 342, and will vary depending on the specific frequency of second clock signal Clk_2 344 currently in use, as well as the particular implementation of control unit 336. In the example of FIG. 4, the control unit 336 calculates an output current "i-sense" during the "calculate time 1" period one and compares the calculated output current with a threshold current level. Because, in this example, output current "i-sense" is greater than the threshold current level, the control unit 336 outputs a second control signal Cntrl_2 332 to control frequency divider 340 to select divide-by-2 circuitry. Subsequently, the control unit 336 calculates an output current "i-sense" during "calculate time 2." Because, in this example, output current "i-sense" is again greater than the threshold current level, the control unit 336 outputs a second control signal Cntrl_2 332 to control frequency divider 340 to select divide-by-4 circuitry. In this example the frequency of the second clock signal 344 is adjusted in steps. While the example reduces the frequency down of second clock signal Clk_2 344, it should be appreciated that the frequency of the second clock signal Clk_2 344 may also be increased if the calculated output current "i-sense" is less than the threshold current level. In other words, the frequency may be adjusted either up or down. The example of selecting the divide-by-2 circuitry and then the divide-by-4 circuitry is an example of slow control mode.

FIG. 4 also illustrates an example of a second mechanism for adjusting the frequency of second clock signal Clk_2 344, which may be used to unlock or exit low-frequency mode when an under-voltage condition at the output of the SCPC is detected. FIG. 4 shows first control signal Cntrl_1 324, which is output by second comparator 320. As mentioned, the fast control mode employs the second comparator 320 and the first control signal Cntrl_1 324. The second comparator 320 monitors Vout 212 at all times, including during the shown "monitoring time." In FIG. 4, the second comparator 320 detects that Vout 312 falls below an output voltage threshold at the end of the "monitoring time." Because Vout 312 is below the threshold voltage, the second comparator 320 generates a first control signal Cntrl_1 324 to control the bypass circuitry of frequency divider circuitry 340. As a result, first clock signal, Clk_1 316 increases to frequency of Clk_3 342, which may be a maximum switching frequency available in the SCPC, e.g. 1 GHz.

The slow control mechanism that employs control unit 336 and various divide-by circuits of the frequency divider circuitry 340 provides control of the second clock signal 344 in a manner that is slower than the fast control mechanism that detects an under-voltage event with the second comparator 320 and bypasses the divide-by circuitry of the frequency divider circuitry 340 using the first control signal Cntrl_1 324. As mentioned, term "slow" in the slow control mechanism and "fast" in the fast control mechanism are used only for convenience of reference. For example, the slow control mechanism may adjust the frequency of the second clock signal very rapidly. An advantage of the slow control mechanism is that it reduces output voltage ripple and improves efficiency under light load conditions. An advantage of the fast control mechanism is that the second comparator 320 can detect a droop in output voltage caused by a fast transition to a heavy load, and can increase the frequency of second clock signal 344 to the maximum switching frequency in a single step.

Figure 5:
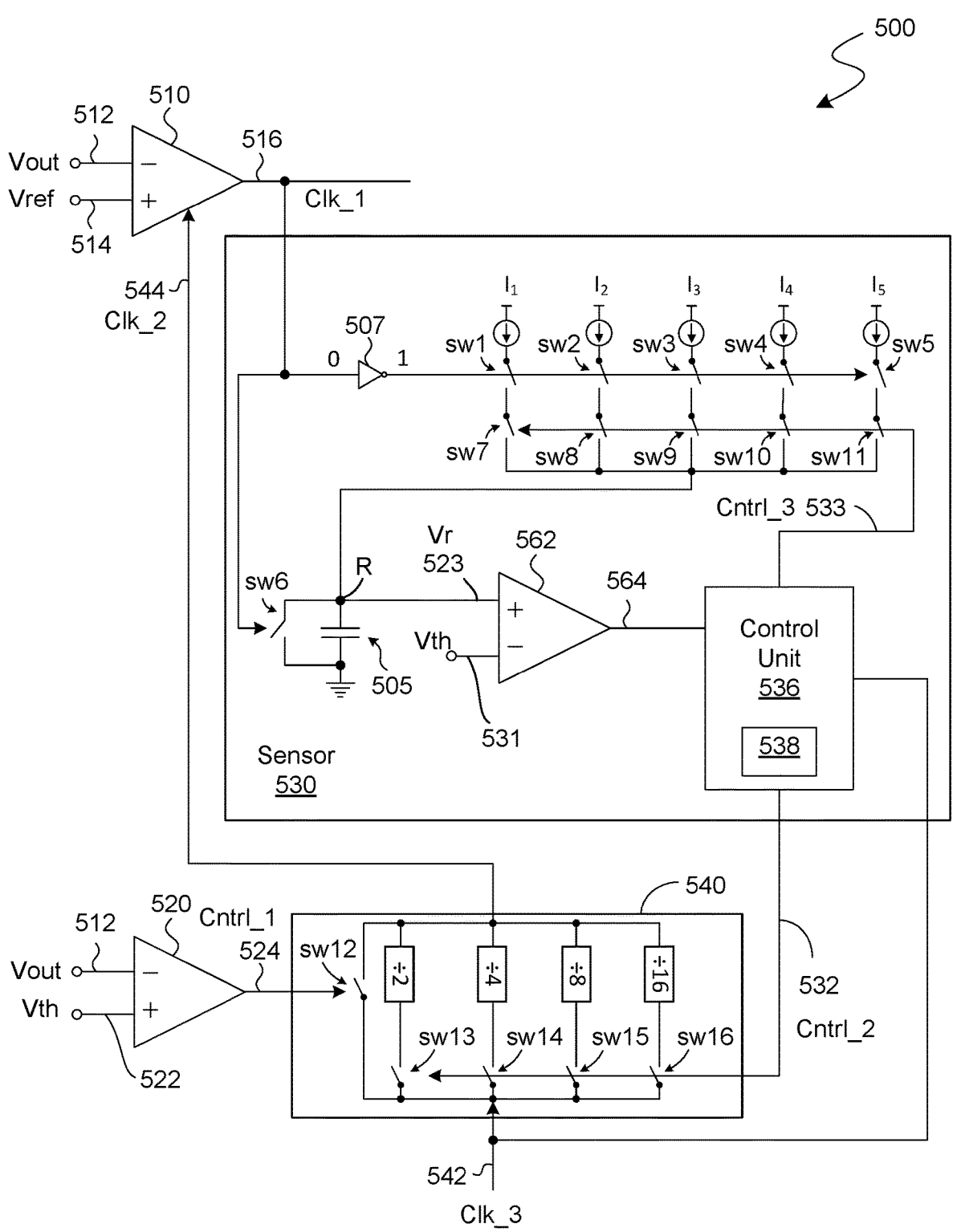
FIG. 5 shows a functional block diagram illustrating features of a signal generator for adjusting a frequency of a clock signal based on a load condition in which the load condition is detected based on a clock signal output by a feedback comparator using a duty cycle detection mechanism according to some embodiments.

FIG. 5 shows features of a signal generator for detecting a load condition based on a first clock signal output by a feedback comparator using a duty cycle detection mechanism according to some embodiments. In the example of FIG. 5, the signal generator provides a control signal as an output that is used to control frequency divider circuitry, which provides a second clock signal to the feedback comparator. This duty cycle detection mechanism is suitable for adjusting the frequency of the second clock signal in a slow control mode. The control signal is based on a level of a current output by an SCPC (or other voltage regulator), which is determined by the sensor. The signal generator comprises a capacitor, a comparator, a plurality of switchable current sources, and a control unit. The signal generator detects whether the length of the OFF time in the duty cycle of the first clock signal output by the feedback comparator indicates that an amount of charge delivered to a load during a particular time period is below an off-time threshold voltage. One or more of the switchable current sources deliver charge to the capacitor during OFF times and the capacitor voltage is used by the comparator to determine whether the off-time threshold voltage has been exceeded. The control unit controls the frequency divider circuitry to adjust the second clock frequency provided to the feedback comparator based on whether the off-time threshold voltage has been exceeded. FIG. 5 also shows features of a fast control mechanism of an SCPC for unlocking or exiting low-frequency mode when an under-voltage condition at the output of the SCPC is detected.

In the embodiment shown in FIG. 5, signal generator 500 of an SCPC comprises a first comparator 510, a second comparator 520, a sensor 530, and a frequency divider 540. Signal generator 500 also comprises control engines and a switch network (not shown), which may be similar to those shown in FIG. 2. First comparator 510 accommodates coupling to receive or otherwise detect an output voltage Vout 512 from the SCPC 500. First comparator 510 samples Vout 512 at times synchronized with second clock signal Clk_2 544, which may be a periodic signal output from frequency divider 540. The comparator 510 generates a first clock signal Clk_1 516 which indicates (for example) when a sampled instance of voltage Vout 512 is less than a reference voltage level Vref 514. The first clock signal Clk_1 516 comprises a duty cycle having an ON time and an OFF time. The ON time occurs when a sampled instance of Vout 512 is less than Vref 514. The OFF time occurs when a sampled instance of Vout 512 is greater than Vref 514.

The second comparator 520 detects when Vout 512 falls below an output voltage threshold 522. In various embodiments, the threshold voltage Vth 522 is equal to or otherwise indicative of an amount of voltage required by a corresponding load. For example, second comparator 520 may detect when a state of the load is heavy. Second comparator 520 compares Vout 512 with threshold voltage Vth 522. If Vout 512 is less than threshold voltage Vth 522, second comparator 520 generates a first control signal 524 to control the bypass circuitry of frequency divider circuitry 540 to bypasses all instances of divider circuitry. When second comparator 520 generates a first control signal 524, the third clock signal Clk_3 542 is output as second clock signal Clk_2 544 to first comparator 510. By providing the third clock signal Clk_3 542 to first comparator 510, SCPC is able to transfer charge to a load at its highest rate. In various embodiments, threshold voltage Vth 522 may be selectively set to one of two or more voltages.

Sensor 530 receives both first clock signal Clk_1 516 and a third clock signal Clk_3 542. The third clock signal Clk_3 542, which may be the highest switching frequency available in the SCPC, e.g., 1 GHz, is also input to frequency divider 540. Based on the first clock signal Clk_1 516, sensor 530 may generate a long off-time signal 564, which corresponds with a relatively light load or a relatively low amount of current drawn by the load. Sensor 530 comprises timing circuitry that comprises a timing capacitor 505, and two or more current sources, each coupled with a respective switch of a first set of switches (sw1, sw2, sw3, sw4, and sw5). In addition, timing circuitry that comprises of sensor 530 comprises a switch sw6 across the timing capacitor 505 and a ground voltage (or other suitable voltage providing a discharge path). The first clock signal Clk_1 516 is coupled with each of the first set of switches and switch sw6.

In the example of FIG. 5, sensor 530 comprises five current sources: $I_1$, $I_2$, $I_3$, $I_4$, and 15. Each of the five current sources are coupled with a respective one of the switches of the first set of switches, i.e., sw1, sw2, sw3, sw4, and sw5. Each current source may provide a different level of current or the same level of current. The current sources are used to charge the timing capacitor 505 during an OFF time of first clock signal Clk_1 516. When the first clock signal Clk_1 516 is in an OFF time (represented by a logic 0), first clock signal Clk_1 516 is inverted by inverter 507 (to a logic 1). The inverted signal controls each of the switches in the first set of switches so that that the current sources are coupled with node R of timing capacitor 505, provided that a switch in a second set of switches is on. Accordingly, when the first clock signal Clk_1 516 is in an OFF time, each of the current sources is capable of being coupled with node R of timing capacitor 505. Whether a particular current source is coupled with the timing capacitor 505 depends on the respective states of switches in the second set of switches: sw7, sw8, sw9, sw10, and sw11. In addition, when the first clock signal Clk_1 516 is in an OFF time, the first clock signal causes switch sw6 to be off, enabling timing capacitor 505 to store charge.

In the example of FIG. 5, sensor 530 also comprises a third comparator 562 and a control unit 536. The second set of switches are controllable by a third control signal 533 output from the control unit 536. Each switch of the second set of switches (sw7, sw8, sw9, sw10, and sw11) connects one of the current sources to node R of the timing capacitor 505, provided a corresponding switch in the first set of switches is on. For example, if the first clock signal Clk_1 516 is in an OFF time, all of the switches in the first set of switches (sw1, sw2, sw3, sw4, and sw5) are on, and if switch sw7 is also on, first current source $I_1$ provides charge to node R to charge timing capacitor 505. The third comparator 562 is coupled with node R of the timing circuitry and with an off-time threshold voltage 531. In an embodiment, the voltage at node R of the timing circuitry is indicative of the length of the off time in the duty cycle of the first clock signal Clk_1 16. In addition, third comparator 562 has an output coupled with control unit 536. The third comparator 562 can provide a long off-time signal 564 to control unit 536 via its output. In an embodiment, the long off-time signal 564 is indicative of the duty cycle of the first clock signal 516 output by the first comparator 510, e.g., the length of the off time in the duty cycle. In an embodiment, the long off-time signal 564 is indicative of a level of a current of the first clock signal or a level of a current conducted by the SCPC 300.

In various embodiments, the third comparator 562 outputs long off-time signal 564 when the voltage of capacitor 505 exceeds the off-time threshold voltage 531. If the voltage of capacitor 505 exceeds the off-time threshold voltage 531, it indicates that an OFF time of the duty cycle of first clock signal Clk_1 516 is relatively long, which corresponds with a light load on Vout of SCPC 500. The reason that sensor 530 comprises five current sources ($I_1$, $I_2$, $I_3$, $I_4$, and 15) is because different off-time durations are required for each frequency of second clock Clk_2 544, and each off-time duration requires providing a different level of current to charge the capacitor 505. A particular one or more of the current sources are selected by the control unit 536 to control the charge-up time of timing capacitor 505. For example, a first frequency in which third clock signal Clk_3 is divided by 16 requires a longer off-time duration than a second frequency in which the third clock signal Clk_3 is divided by 2. At the first frequency in this example, a single current source, e.g., $I_1$, may be used to charge timing capacitor 505 during the OFF time, whereas at the second frequency, all five current sources, e.g., $I_1$, $I_2$, $I_3$, $I_4$, and $I_5$, may be used to charge timing capacitor 505 during the OFF time.

Control unit 536 of sensor 530 comprises circuitry for executing machine-readable instructions, such as a programmable gate array, application-specific integrated circuit, a microprocessor, controller, digital logic circuitry, or other suitable circuitry. In addition, control unit 536 may comprise a memory 538 for storing machine-readable instructions and configuration parameters. In an embodiment, memory 538 may store one or more lookup tables to store various predetermined values and/or machine-readable instructions for selecting current sources (e.g., $I_1$, $I_2$, $I_3$, $I_4$, and $I_5$) and controlling switches of the second set of switches (e.g., sw7, sw8, sw9, sw10, and sw11). In addition, memory 538 may store one or more lookup tables to store various predetermined values and/or machine-readable instructions for selecting particular divide-by circuitries of frequency divider 540. In an embodiment, memory 538 may store a function for adjusting the second clock signal based on the detected duty cycle of the first clock signal.

Control unit 536 is coupled to receive the long off-time signal 564 from third comparator 562 and third clock signal, Clk_3 542, which may be the highest switching frequency available in the SCPC, e.g., 1 GHz. In addition, control unit 536 may be further coupled to receive additional information for use in determining selections of switches in the first and second set of switches, such as various reference information. Examples of reference information include parameters defining an operational mode of the SCPC 300, e.g., buck or boost mode, or a sequence of switch states. Control unit 536 outputs the second control signal Cntrl_2 532 to control switches of the frequency divider (e.g., sw13, sw14, sw15, and sw16) and the third control signal Cntrl_3 533 to control switches of the second set of switches.

In an embodiment, control unit 536 selects successive lower frequencies in response to assertion of the long off-time signal 564. For example, control unit 536 may select a frequency that divides the third clock signal, Clk_3 542 by two in response to a first assertion of the long off-time signal 564. Following a second assertion of the long off-time signal 564, control unit 536 may select a divide by four frequency, and so on, successively selecting divide by 8, and then divide by 16 in response to subsequent assertions of the long off-time signal 564.

In one example of operation of the embodiment shown in FIG. 5, during the OFF time, one or more of the switchable current sources deliver charge to the timing capacitor 505, increasing a voltage at terminal R. As the voltage rises, the third comparator 562 compares the timing capacitor voltage with the off-time threshold voltage 531. If the timing capacitor voltage exceeds the off-time threshold voltage 531, it indicates that the OFF time in the duty cycle of the clock signal is relatively long, which corresponds with a relatively light load or a relatively low amount of current drawn by the load. If the capacitor voltage exceeds the off-time threshold voltage 531, the third comparator 562 provides a long off-time signal 564 to the control unit 536, which responds by generating a second control signal 532 to control the frequency divider circuitry 540 to reduce the clock frequency of second clock signal Clk_2 544 that is provided to the feedback comparator 510.

Figure 6:
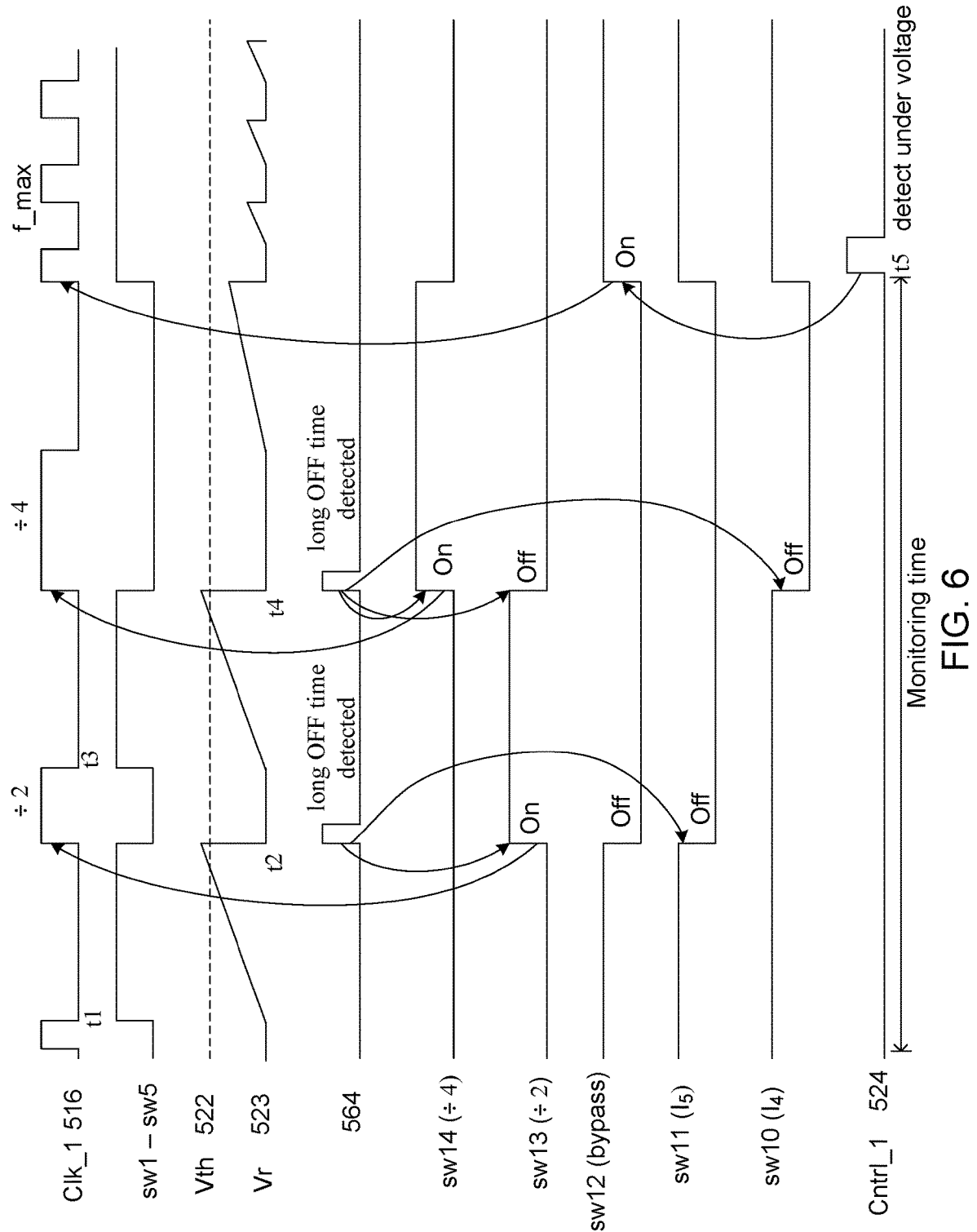
FIG. 6 shows a timing diagram illustrating features of operations by the signal generator of FIG. 5 according to an embodiment.

FIG. 6 is a timing diagram illustrating an example of signal generator 500 in operation. Referring first to first clock signal Clk_1 516, at time t1, the first clock signal begins an OFF time of a duty cycle. As the OFF time continues, the voltage Vr 523 begins increasing as (at least) current sources 14, and 15 deliver charge to the timing capacitor 505. At time t2, the voltage Vr 523 exceeds the off-time threshold voltage 522. The third comparator 562 detects the off-time threshold voltage 522 being exceeded and asserts long off-time signal 564. The assertion of long off-time signal 564 causes the control unit 536 to generate a second control signal 532 (not shown). In response to receipt of the second control signal 532, switch sw13 of the frequency divider circuitry 540 is turned on, resulting in the first clock signal Clk_1 516 being divided by two. In addition, the control unit 536 generates a third control signal 533 (not shown) that causes switch sw11 of the second set of switches to turn off, which results in current from current source Is not being supplied to the timing capacitor 505 during OFF periods. In various embodiments, threshold voltage Vth 522 may be selectively set to one of two or more voltages.

At time t3, the first clock signal 516 begins another OFF time of a duty cycle. As the OFF time continues, the voltage Vr 523 begins increasing as (at least) current source 14 delivers charge to the timing capacitor 505. At time t4, the voltage Vr 523 exceeds the off-time threshold voltage 522. The third comparator 562 detects the off-time threshold voltage 522 being exceeded and asserts long off-time signal 564. The assertion of long off-time signal 564 causes the control unit 536 to generate a second control signal 532 (not shown). In response to receipt of the second control signal 532, switch sw14 of the frequency divider circuitry 540 is turned on and switch sw13 of the frequency divider circuitry 540 is turned off, resulting in the first clock signal Clk_1 516 being divided by four. In addition, the control unit 536 generates a third control signal 533 (not shown) that causes switch sw10 of the second set of switches to turn off, which results in current from current source 14 not being supplied to the timing capacitor 505 during OFF periods.

FIG. 6 also shows an example of unlocking or exiting the slow control mode when an under-voltage condition at the output of the SCPC is detected. During the "monitoring time" shown in FIG. 6, the second comparator 520 monitors Vout 512. At time t5, the second comparator 520 detects that Vout 512 has fallen below an output voltage threshold Vth 222. Because Vout 512 below the threshold voltage Vth 222, the second comparator 520 asserts the first control signal Cntrl_1 524 to control the bypass circuitry of frequency divider circuitry 540. In response to first control signal Cntrl_1 524, switch sw12 is turned on. This causes the divide-by circuits in frequency divider circuitry 540 to be bypassed. As a result of switch sw12 being turned on, the first clock signal, Clk_1 516 increases to a maximum switching frequency fmax, e.g., the frequency of the second clock signal 544.

Figure 7A:
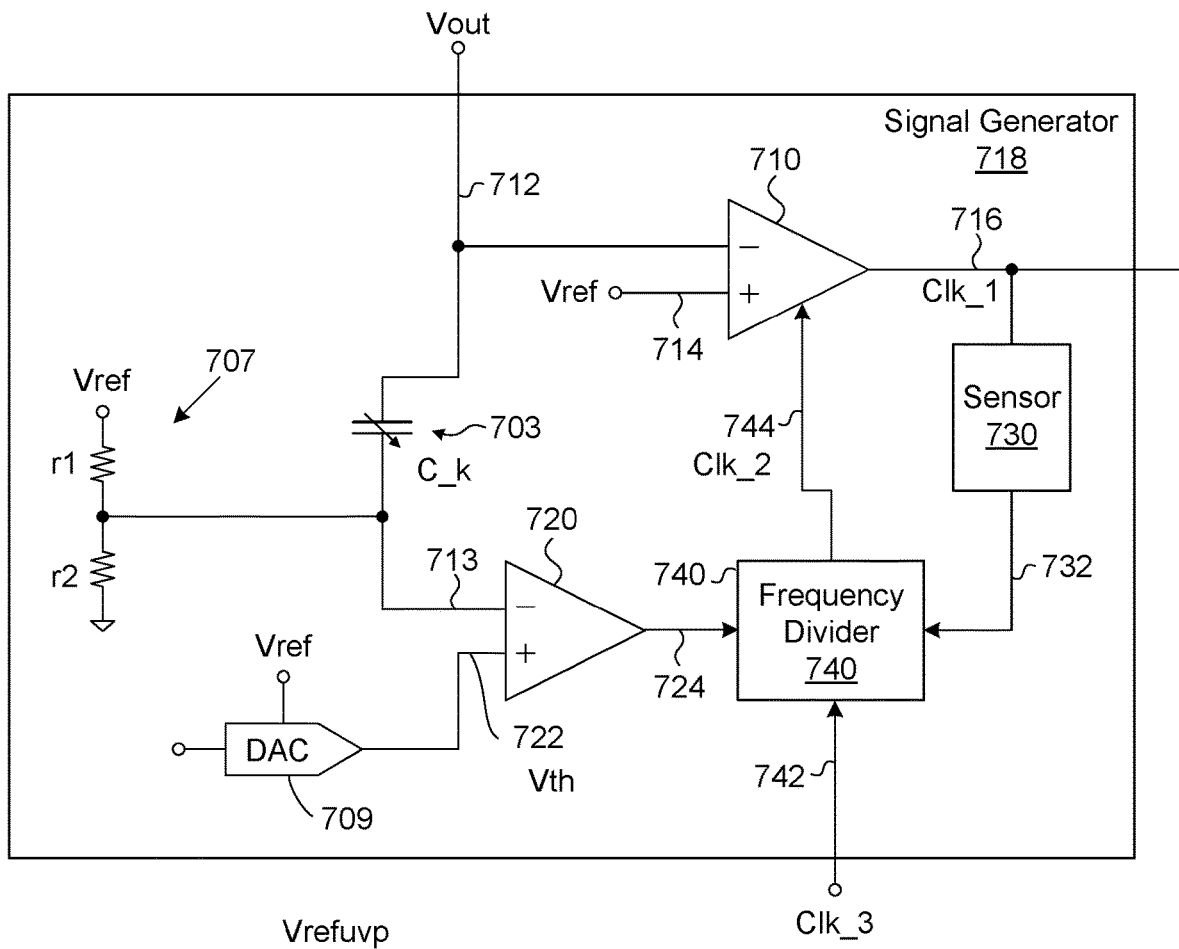
FIG. 7A and FIG. 7B show functional block diagrams illustrating features of signal generators of that adjust a frequency of a clock signal used by a feedback comparator based on a detected load condition according to various embodiments.
Figure 7B:
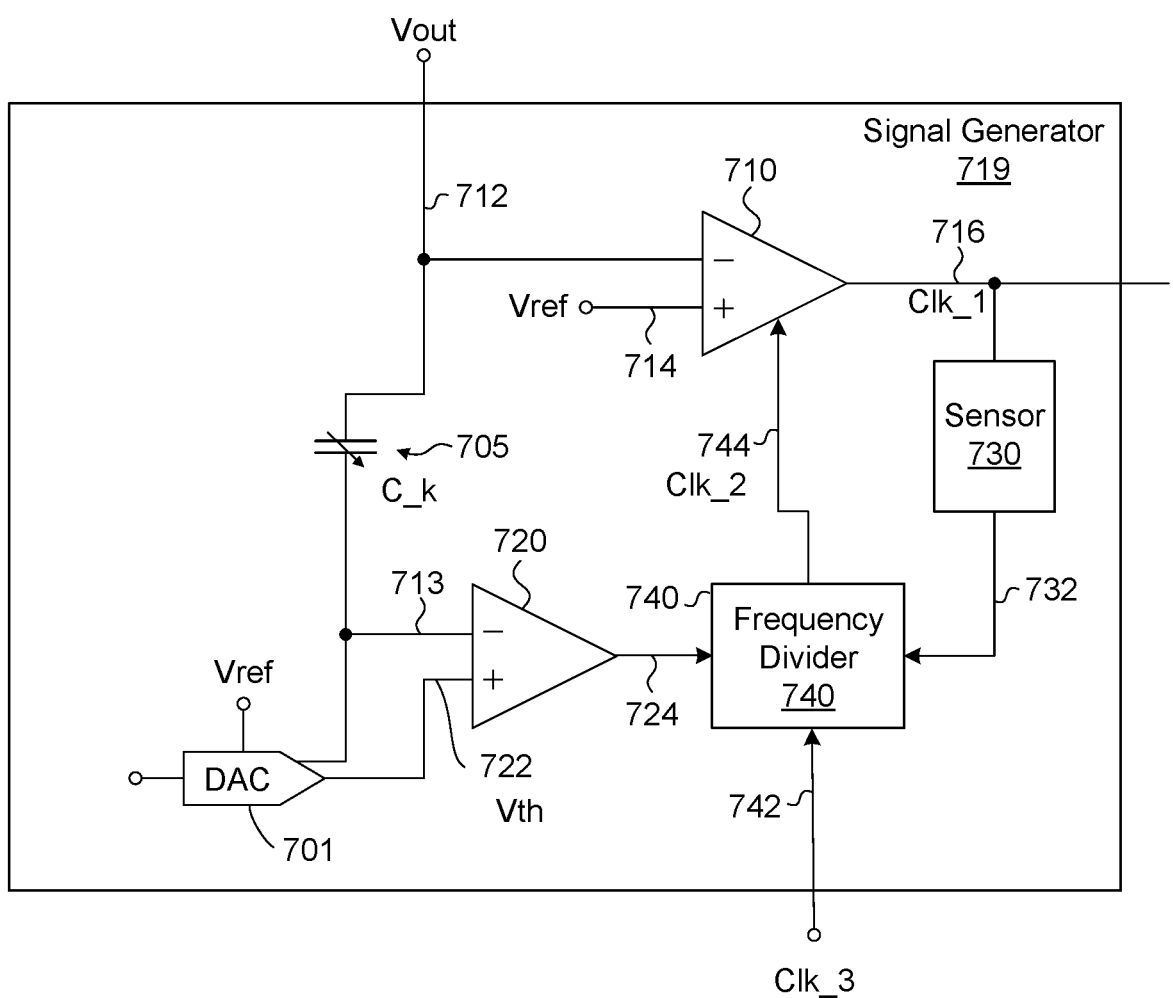

FIG. 7A and FIG. 7B show features of a signal generator of an SCPC that adjusts a maximum switching frequency used by a feedback comparator based on a detected load condition according to various embodiments. The signal generator comprises two modes or mechanisms for adjusting the switching frequency supplied to the feedback comparator: a slow control mechanism and a fast control mechanism. The example of FIG. 7A and FIG. 7B illustrates features of a second comparator employed in the fast control mechanism according to an embodiment As shown in FIG. 7A and FIG. 7B, signal generators 718 and 719 comprise a first comparator 710, a second comparator 720, a sensor 730, and a frequency divider 740. The signal generator 718 may be a component of an SCPC that also includes, one or more control engines and a switch network, that are not shown in FIG. 7A and FIG. 7B, but which may be similar to those shown in FIG. 2. First comparator 710 accommodates coupling to receive or otherwise detect an output voltage Vout 712 from the SCPC. First comparator 710 samples Vout 712 at times synchronized with second clock signal Clk_2 744, which may be a periodic signal output from frequency divider 740. The second clock signal Clk_2 744 may be the maximum switching frequency of first comparator 710. The first comparator 710 generates a first clock signal Clk_1 716 which indicates (for example) when a sampled instance of voltage Vout 712 is less than a reference voltage level Vref 714.

A slow control mechanism for adjusting the maximum switching frequency supplied to the first comparator 710 is provided by a sensor 730 and frequency divider 740. The signal generator 718 may include any suitable slow control mechanism for adjusting the maximum switching frequency 744. In some embodiments, sensor 730 may use a pulse counting mechanism and be the same as or similar to sensor 330 described herein. In some embodiments, sensor 730 may use a duty cycle detection mechanism and be the same as or similar to sensor 530 described herein. Sensor 230 is coupled with the frequency divider circuitry 740 to provide it with a second control signal 732. In various embodiments, frequency divider 740 may be the same as or similar to frequency divider 240 or frequency divider 540.

A fast control mechanism for adjusting the switching frequency supplied to the first comparator 710 is provided by a second comparator 720. The second comparator 720 may detect when a state of the load is heavy by detecting when Vout 712 falls below an output voltage threshold 722. In various embodiments, the threshold voltage Vth 722 is equal to or otherwise indicative of an amount of voltage required by a corresponding load. If Vout 712 is less than threshold voltage Vth 722, second comparator 720 generates a first control signal 724 to control bypass circuitry of frequency divider circuitry 740 to bypasses all instances of divider circuitry, which causes the signal generator 718 to exit a slow control mode and enter a fast control mode. In the fast control mode, the third clock signal Clk_3 742 is output as second clock signal Clk_2 744 to first comparator 710. The third clock signal Clk_3 742 may be the highest switching frequency available in the SCPC, which enables the SCPC to transfer charge to a load at its highest rate. In various embodiments, threshold voltage Vth 722 may be selectively set to one of two or more voltages.

In the example of FIG. 7A, input 713 of second comparator 720 is connected with the SCPC output voltage Vout 712 via a network comprising coupling capacitor C_k 703 and voltage divider 707. A second input of the second comparator 720 is connected with digital-to-analog converter (DAC) 709 to receive Vth 722. The voltage divider 707 includes resistors r1 and r2 connected in series between voltage Vref and a second voltage, such as a ground or other similar potential. When SCPC output voltage Vout 712 is at or substantially approximates a DC voltage, coupling capacitor C_k 703 behaves as an open circuit and input 713 of second comparator 720 receives the voltage supplied by the voltage divider 707. The voltage supplied by the voltage divider 707 may be above Vth 722 so that the fast control mechanism is not enabled. When the SCPC output voltage Vout 712 is changing, the coupling capacitor C_k 703 acts as short circuit and input 713 of second comparator 720 receives Vout 712. If output voltage Vout 712 is rising and above Vth 722, the fast control mechanism remains not enabled. However, if Vout 712 is falling and drops below Vth 722, the fast control mechanism is enabled.

In embodiments, the DAC 709 is used to set Vth 722. A first input of the DAC 709 receives a binary value for programming a particular value for Vth 722, a second input of the DAC 709 receives voltage Vref. In some embodiments, the DAC 709 allows the threshold voltage Vth provided to input 722 of the second comparator 720 to be configured so that a particular level of undershoot in output voltage Vout 712 can be detected. In some embodiments, the capacitive value of capacitor C_k 703 is variable. When Vout 712 changes because of a change in load conditions, it changes with a particular slew rate. The value of capacitor C_k 703 can be adjusted so that the second comparator 720 only detects changes above or below a desired slew rate value. In various embodiments, the value for threshold voltage Vth 722 and capacitor C_k 703 are set by a control unit of sensor 730 or other digital logic.

Signal generator 719 is similar to signal generator 718, except that the voltage divider 707 is omitted. In the example of FIG. 7B, input 713 of the second comparator 720 is connected with the SCPC output voltage Vout 712 via a coupling capacitor C_k 705 and a first output of digital-to-analog converter (DAC) 701. Input 722 of the second comparator 720 is connected with a second output of digital-to-analog converter (DAC) 701. The DAC 701 is used to set Vth 722. A first input of the DAC 709 receives a binary value for programming a particular value for Vth 722. A second input of the DAC 709 receives a binary value for programming a particular value for voltage Vref 722.

The DAC 701 allows both the threshold voltage Vth provided to input 722 of the second comparator 720 and the voltage provided to input 713 to be set to desired values. The coupling capacitor C_k 705 serves the same function in signal generator 719 that coupling capacitor C_k 703 serves in signal generator 718. When Vout 712 is at or substantially approximates a DC voltage, coupling capacitor C_k 705 behaves as an open circuit and input 713 of second comparator 720 receives the voltage supplied by the DAC 701. If output voltage Vout 712 is falling, the fast control mechanism remains is enabled when 722 drops below Vth 722. In some embodiments, the capacitive value of capacitor C_k 703 is variable. When Vout 712 changes because of a change in load conditions, it changes with a particular slew rate. The value of capacitor C_k 705 can be adjusted so that the second comparator 720 only detects changes above or below a desired slew rate value. In various embodiments, the value for threshold voltage Vth 722 and capacitor C_k 705 are set by a control unit of sensor 730 or other digital logic.

Advantages of the example fast control mechanisms, depicted in FIG. 7A and FIG. 7B, for adjusting the maximum switching frequency provided to the first comparator 710 include a digitally configurable threshold voltage Vth and isolating the input 713 that receives Vout 712 when the load on the SCPC is not changing.

Figure 8:
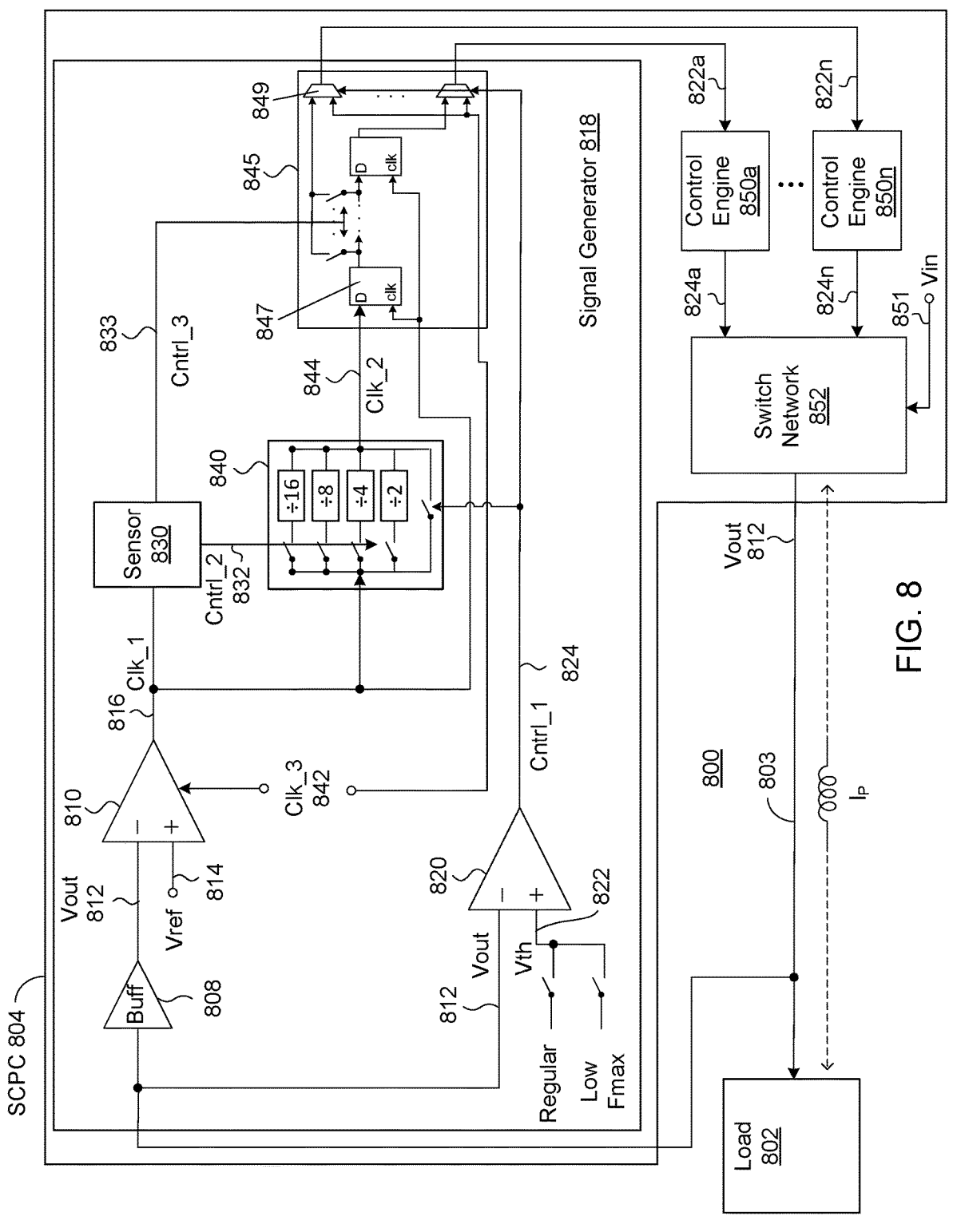
FIG. 8 shows a functional block diagram illustrating features of a signal generator that adjusts the frequency of a clock signal output from a feedback comparator based on a detected load condition according to various embodiments.

FIG. 8 shows features of a system comprising an SCPC having a signal generator that adjusts the frequency of a first clock signal output from a feedback comparator based on a detected load condition according to various embodiments. The SCPC comprises two mechanisms for adjusting the frequency of the first clock signal that are referred to, for convenience of reference, as "slow control" and "fast control" modes. The slow control mechanism comprises a sensor that monitors the first clock signal and outputs second and third control signals. The second control signal is used to control frequency divider circuitry. The third control signal is used to control an interleaving unit. The second and third control signals are based on a level of a current output by the SCPC (or other voltage regulator), which is determined by the sensor. The sensor may use a pulse counting mechanism or a duty cycle detection mechanism to determine the level of output current. The fast control mechanism comprises a second comparator that monitors an output voltage of the SCPC. The second comparator generates a first control signal for exiting the slow control mode when an under-voltage condition is detected.

In the embodiment shown in FIG. 8, the system 800 includes SCPC 804 that provides an output voltage Vout 812 to load 802 via a trace 803. In some embodiments, a length of trace 803 (which conducts Vout) between SCPC 804 and one or more components of a load 802 may be such that parasitic inductance $I_P$ of the trace 803 is relatively large. The system 800 may include an output capacitor Cout (not shown). As described, the parasitic inductance $I_P$ of the trace together with a capacitance can result in voltage ringing.

The SCPC 804 comprises a signal generator 818, one or more control engines 850a, . . . 850n, and switch network 852. The switch network 852 comprises at least one capacitor and switch circuitry. The control engines 850a, . . . 850n receive fourth clock signals 822a, . . . 822n. The fourth clock signals are used by the control engines 850a, . . . 850n to generate control signals 824a, . . . , 824n, which variously operate switch circuitry within switch network 852. The control signals 824a, . . . , 824n cause the switch network 852 to transition through a sequence of switch states that cause charge to be delivered to load 802.

The signal generator 818 comprises a first comparator 810, which may also be referred to as a feedback comparator, a second comparator 820, a sensor 830, frequency divider circuitry 840, and an interleaving unit 845. First comparator 810 accommodates coupling to receive or otherwise detect an output voltage Vout 812 from the SCPC 804. In an embodiment, the first comparator 810 is coupled with output voltage Vout 812 via a buffer 808. First comparator 810 samples Vout 812 at times synchronized with the third clock signal Clk_3 842. In the example of FIG. 8, the third clock signal Clk_3 842 may be a maximum switching frequency, e.g., 1 GHz, which can be adjusted by the slow control mechanism. The first comparator 810 generates a first clock signal Clk_1 816 which indicates (for example) when a sampled instance of voltage Vout is less than a reference voltage level Vref 814. Frequency adjustment via the slow control mechanism, either up or down, is realized at the output of the first comparator 810 using the sensor 830, the frequency divider circuitry 840, and the interleaving unit 845. Upward frequency adjustment via fast control mechanism is also realized at the output of the first comparator 810 using the frequency divider circuitry 840, the interleaving unit 845, and the second comparator 820.

In the example of FIG. 8, the slow control mechanism of signal generator 818 comprises sensor 830 that monitors the first clock signal Clk_1 816. The sensor 830 outputs a second control signal 832 that is used to control frequency divider circuitry 840 and a third control signal Cnrtl_3 833 that is used to control interleaving unit 845. The control signals 832 and 833 are based on a level of a current output by the SCPC 804 (or other voltage regulator), which is determined by the sensor 830. In some embodiments, the sensor 830 may be the same as or similar to the sensor 330, which comprises a pulse counting mechanism to determine the level of output current. In some embodiments, the sensor 830 may be the same as or similar to the sensor 530, which comprises a duty cycle detecting mechanism to determine the level of output current.

In the example of FIG. 8, the fast control mechanism of signal generator 818 comprises the second comparator 820 that monitors the output voltage of the SCPC 804. The second comparator 820 is coupled with Vout 812, and threshold voltage Vth 822, and generates a first control signal Cnrtl_1 824 when an under-voltage condition is detected. The output of the second comparator 820 is coupled with frequency divider circuitry 840 and interleaving unit 845.

The frequency divider circuitry 840 is coupled to receive both the first control signal Cnrtl_1 824 from the second comparator 820 and the second control signal 832 from the sensor 830. The frequency divider circuitry 840 is also coupled with first clock signal Clk_1, 816 that is output from the first comparator 810. The frequency divider circuitry 840 generates a second clock signal Clk_2 844, based on the first clock signal Clk_1, 816. The second clock signal 844 is input to the interleaving mechanism 845. Frequency divider circuitry 840 comprises one or more selectable instances of divide-by circuitry. In one embodiment, frequency divider circuitry 840 comprises divide-by-2 circuitry, divide-by-4 circuitry, divide-by-8 circuitry, and divide-by-16 circuitry. Additional or fewer instances of divide-by circuitry, and divisors other than the example divisors may be provided in various embodiments. The second control signal 832 received from sensor 830 is used by frequency divider circuitry 840 to select one of the instances of divide-by circuitry. The frequency divider circuitry 840 also comprises bypass circuitry that bypasses all instances of divider circuitry. The first control signal 824 received from second comparator 820 is used by frequency divider circuitry 840 to select the bypass circuitry. When the bypass circuitry is selected, the third clock signal Clk_3 842 is output as the second clock signal Clk_2 844.

The interleaving unit 845 comprises two or more storage devices 847, such as D flip-flops, and two or more multiplexing devices 849. The output of one storage device may be connected to the input of another storage device, forming a shift register circuit. The storage devices 847 are coupled with and clocked by the first clock signal Clk_1 816. The interleaving unit 845 also includes switches to connect respective outputs of each storage device 847 to a first input of one of the multiplexing devices 849. Outputs of the multiplexing devices 849 are coupled with and provide respective fourth clock signals 822a, . . . 822n to control engines 850a, . . . 850n. Second inputs of each storage device 847 are coupled with and receive the third clock signal Clk_3 842. The interleaving unit 845 is coupled to receive the second clock signal Clk_2 844. For example, a first input of a first storage device 847 of the interleaving unit 845 receives the second clock signal 844. The interleaving unit 845 is coupled to the third control signal 833 from the sensor 830. The third control signal 833 determines which ones of the switches are controlled to connect an output of a storage device with a multiplexing device. In an embodiment, the third control signal 833 configures the interleaving unit 845 to divide the second clock signal Clk_2 844 by an integer divisor, e.g., 2, 3, 4, etc.

The interleaving unit 845 is also coupled with the second comparator 820 and receives the first control signal Cnrtl_1 824. The first control signal 824 is coupled with inputs of the multiplexing devices 849 that are used to select which clock signal input to a device 849 is output to a control engine 850. In an embodiment, the first control signal 824 controls the interleaving unit 845 to output either a divided-down version second clock signal Clk_2 844 or the third clock signal Clk_3 842. In an embodiment, the interleaving unit 845 is coupled to receive the first control signal from the second comparator, the third control signal from the sensor, the second clock signal from the frequency divider circuit, and the third clock signal, wherein the interleaving unit is to generate a fourth clock signal based on the second clock signal. The interleaving unit 845 is coupled with and provides the fourth clock signal to control engines 850a, . . . 850n.

As mentioned, in the example of FIG. 8, the slow control mechanism of signal generator 818 comprises sensor 830 that monitors the first clock signal 816, and outputs a second control signal 832 that is used to control frequency divider circuitry 840, and a third control signal 833 that is used to control interleaving unit 845. In various embodiments, the sensor 830 determines a frequency for fourth clock signals 822a, . . . 822n based on an output current of the SCPC. Because the slow control mechanism of signal generator 818 comprises two frequency adjustment stages, the determination of a frequency for the fourth clock signals 822a, . . . 822n comprises two components. A first component specifies a particular divide-by circuitry of stage one, e.g., frequency divider circuitry 840. A second component specifies a number of storage devices to connect to a multiplexing device of stage two, e.g., interleaving unit 845. For example, sensor 830 may determine that the first clock signal should be divided by 32. In this example, the first component may be a selection of divide-by-16 circuitry of the frequency divider circuitry 840, and the second component may be a selection of two multiplexing devices of the interleaving unit 845. The first and second component together achieve the determined divided-by-32 value. Sensor 830 may comprise a look-up table or machine-readable instructions stored in a memory or other logic for determining how the dividing down of the first clock signal should be apportioned between the frequency divider 840 and the interleaving unit 845.

As mentioned, in the example of FIG. 8, the fast control mechanism of signal generator 818 comprises the second comparator 820 that monitors the output voltage of the SCPC 804. The second comparator 820 generates a first control signal Cnrtl_1 824 when an under-voltage condition is detected. Assertion of the first control signal 824, which is coupled with the input selecting inputs of the multiplexing devices 849, causes the multiplexing devices 849 to output the third clock signal Clk_3 842, which may be the highest switching frequency available in the SCPC, e.g., 1 GHz. In an embodiment, assertion of the first control signal 824 cause the signal generator 818 to exit the slow control mode.

Figure 9:
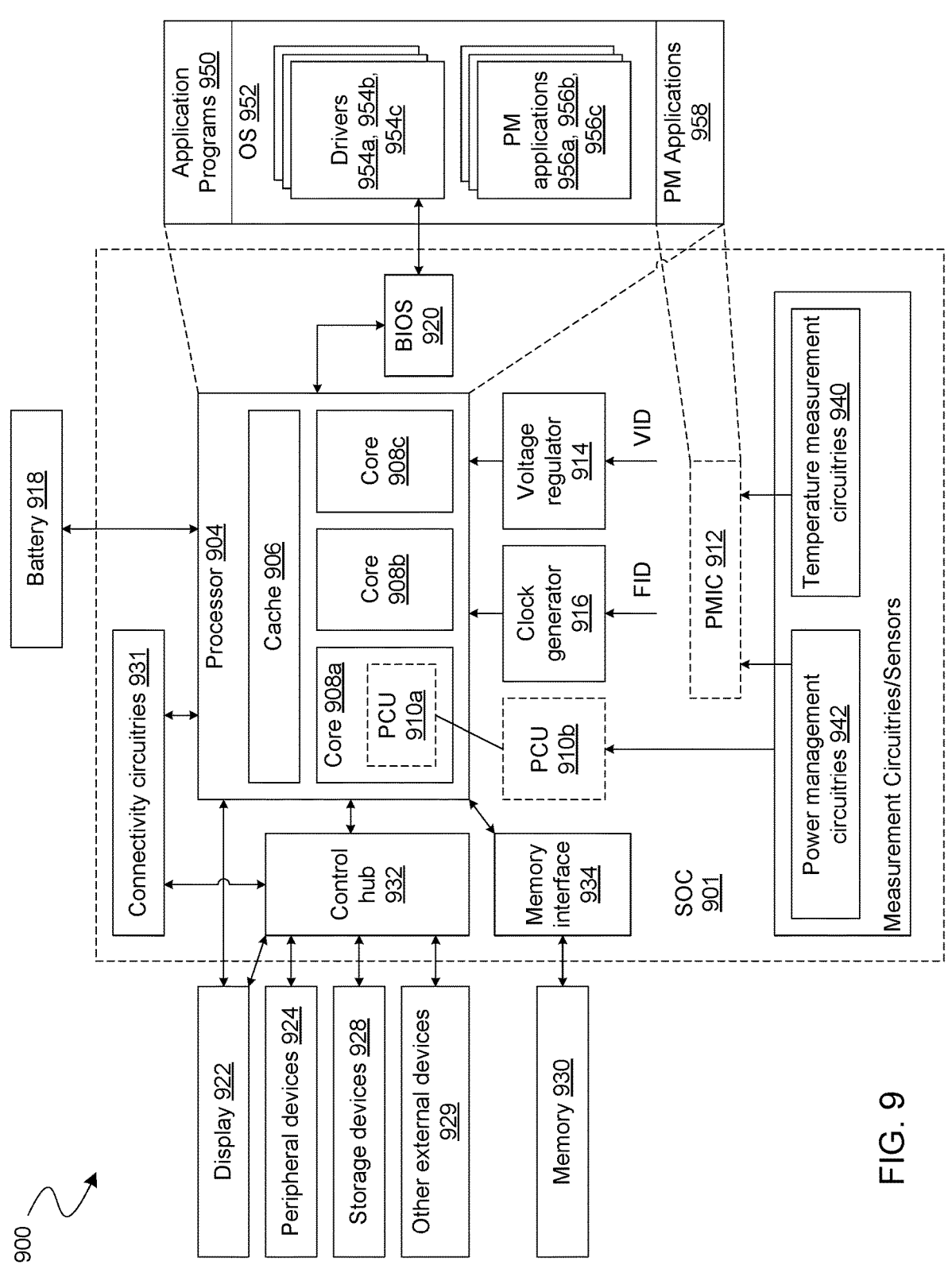
FIG. 9 shows a circuit block diagram illustrating features of a computer device to adjust a frequency of a clock signal used by a feedback comparator, or to adjust the frequency of a clock signal output from a feedback comparator, based on a detected load condition according to an embodiment.

FIG. 9 illustrates a computer system or computing device 900 (also referred to as device 900), where a mode of voltage regulation is determined, in accordance with some embodiments. It is pointed out that those elements of FIG. 9 having the same reference numbers (or names) as the elements of any other figure can operate or function in any manner similar to that described, but are not limited to such.

In some embodiments, device 900 represents an appropriate computing device, such as a computing tablet, a mobile phone or smart-phone, a laptop, a desktop, an Internet-of-Things (JOT) device, a server, a wearable device, a set-top box, a wireless-enabled e-reader, or the like. It will be understood that certain components are shown generally, and not all components of such a device are shown in device 900.

In an example, the device 900 comprises a SoC (System-on-Chip) 901. An example boundary of the SOC 901 is illustrated using dotted lines in FIG. 9, with some example components being illustrated to be included within SOC 901—however, SOC 901 may include any appropriate components of device 900.

In some embodiments, device 900 includes processor 904. Processor 904 can include one or more physical devices, such as microprocessors, application processors, microcontrollers, programmable logic devices, processing cores, or other processing means. The processing operations performed by processor 904 include the execution of an operating platform or operating system on which applications and/or device functions are executed. The processing operations include operations related to I/O (input/output) with a human user or with other devices, operations related to power management, operations related to connecting computing device 900 to another device, and/or the like. The processing operations may also include operations related to audio 110 and/or display I/O.

In some embodiments, processor 904 includes multiple processing cores (also referred to as cores) 908a, 908b, 908c. Although merely three cores 908a, 908b, 908c are illustrated in FIG. 9, the processor 904 may include any other appropriate number of processing cores, e.g., tens, or even hundreds of processing cores. Processor cores 908a, 908b, 908c may be implemented on a single integrated circuit (IC) chip. Moreover, the chip may include one or more shared and/or private caches, buses or interconnections, graphics and/or memory controllers, or other components.

In some embodiments, processor 904 includes cache 906. In an example, sections of cache 906 may be dedicated to individual cores 908 (e.g., a first section of cache 906 dedicated to core 908a, a second section of cache 906 dedicated to core 908b, and so on). In an example, one or more sections of cache 906 may be shared among two or more of cores 908. Cache 906 may be split in different levels, e.g., level 1 (L1) cache, level 2 (L2) cache, level 3 (L3) cache, etc.

In some embodiments, a given processor core (e.g., core 908a) may include a fetch unit to fetch instructions (including instructions with conditional branches) for execution by the core 908a. The instructions may be fetched from any storage devices such as the memory 930. Processor core 908a may also include a decode unit to decode the fetched instruction. For example, the decode unit may decode the fetched instruction into a plurality of micro-operations. Processor core 908a may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, an execution unit may execute instructions out-of-order. Hence, processor core 908a (for example) may be an out-of-order processor core in one embodiment. Processor core 908a may also include a retirement unit. The retirement unit may retire executed instructions after they are committed. In an embodiment, retirement of the executed instructions may result in processor state being committed from the execution of the instructions, physical registers used by the instructions being de-allocated, etc. The processor core 908a may also include a bus unit to enable communication between components of the processor core 908a and other components via one or more buses. Processor core 908a may also include one or more registers to store data accessed by various components of the core 908a (such as values related to assigned app priorities and/or sub-system states (modes) association.

In some embodiments, device 900 comprises connectivity circuitries 931. For example, connectivity circuitries 931 includes hardware devices (e.g., wireless and/or wired connectors and communication hardware) and/or software components (e.g., drivers, protocol stacks), e.g., to enable device 900 to communicate with external devices. Device 900 may be separate from the external devices, such as other computing devices, wireless access points or base stations, etc.

In an example, connectivity circuitries 931 may include multiple different types of connectivity. To generalize, the connectivity circuitries 931 may include cellular connectivity circuitries, wireless connectivity circuitries, etc. Cellular connectivity circuitries of connectivity circuitries 931 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 931 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 931 may include a network interface, such as a wired or wireless interface, e.g., so that a system embodiment may be incorporated into a wireless device, for example, cell phone or personal digital assistant.

In some embodiments, device 900 comprises control hub 932, which represents hardware devices and/or software components related to interaction with one or more I/O devices. For example, processor 904 may communicate with one or more of display 922, one or more peripheral devices 924, storage devices 928, one or more other external devices 929, etc., via control hub 932. Control hub 932 may be a chipset, a Platform Control Hub (PCH), and/or the like.

For example, control hub 932 illustrates one or more connection points for additional devices that connect to device 900, e.g., through which a user might interact with the system. For example, devices (e.g., devices 929) that can be attached to device 900 include microphone devices, speaker or stereo systems, audio devices, video systems or other display devices, keyboard or keypad devices, or other 110 devices for use with specific applications such as card readers or other devices.

As mentioned above, control hub 932 can interact with audio devices, display 922, etc. For example, input through a microphone or other audio device can provide input or commands for one or more applications or functions of device 900. Additionally, audio output can be provided instead of, or in addition to display output. In another example, if display 922 includes a touch screen, display 922 also acts as an input device, which can be at least partially managed by control hub 932. There can also be additional buttons or switches on computing device 900 to provide I/O functions managed by control hub 932. In one embodiment, control hub 932 manages devices such as accelerometers, cameras, light sensors or other environmental sensors, or other hardware that can be included in device 900. The input can be part of direct user interaction, as well as providing environmental input to the system to influence its operations (such as filtering for noise, adjusting displays for brightness detection, applying a flash for a camera, or other features).

In some embodiments, control hub 932 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 922 represents hardware (e.g., display devices) and software (e.g., drivers) components that provide a visual and/or tactile display for a user to interact with device 900. Display 922 may include a display interface, a display screen, and/or hardware device used to provide a display to a user. In some embodiments, display 922 includes a touch screen (or touch pad) device that provides both output and input to a user. In an example, display 922 may communicate directly with the processor 904. Display 922 can be one or more of an internal display device, as in a mobile electronic device or a laptop device or an external display device attached via a display interface (e.g., DisplayPort, etc.). In one embodiment display 922 can be a head mounted display (HMD) such as a stereoscopic display device for use in virtual reality (VR) applications or augmented reality (AR) applications.

In some embodiments and although not illustrated in the figure, in addition to (or instead of) processor 904, device 900 may include Graphics Processing Unit (GPU) comprising one or more graphics processing cores, which may control one or more aspects of displaying contents on display 922.

Control hub 932 (or platform controller hub) may include hardware interfaces and connectors, as well as software components (e.g., drivers, protocol stacks) to make peripheral connections, e.g., to peripheral devices 924.

It will be understood that device 900 could both be a peripheral device to other computing devices, as well as have peripheral devices connected to it. Device 900 may have a "docking" connector to connect to other computing devices for purposes such as managing (e.g., downloading and/or uploading, changing, synchronizing) content on device 900. Additionally, a docking connector can allow device 900 to connect to certain peripherals that allow computing device 900 to control content output, for example, to audiovisual or other systems.

In addition to a proprietary docking connector or other proprietary connection hardware, device 900 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 931 may be coupled to control hub 932, e.g., in addition to, or instead of, being coupled directly to the processor 904. In some embodiments, display 922 may be coupled to control hub 932, e.g., in addition to, or instead of, being coupled directly to processor 904.

In some embodiments, device 900 comprises memory 930 coupled to processor 904 via memory interface 934. Memory 930 includes memory devices for storing information in device 900. Memory can include nonvolatile (state does not change if power to the memory device is interrupted) and/or volatile (state is indeterminate if power to the memory device is interrupted) memory devices. Memory device 930 can be a dynamic random access memory (DRAM) device, a static random access memory (SRAM) device, flash memory device, phase-change memory device, or some other memory device having suitable performance to serve as process memory. In one embodiment, memory 930 can operate as system memory for device 900, to store data and instructions for use when the one or more processors 904 executes an application or process. Memory 930 can store application data, user data, music, photos, documents, or other data, as well as system data (whether long-term or temporary) related to the execution of the applications and functions of device 900.

Elements of various embodiments and examples are also provided as a machine-readable medium (e.g., memory 930) for storing the computer-executable instructions (e.g., instructions to implement any other processes discussed herein). The machine-readable medium (e.g., memory 930) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 900 comprises temperature measurement circuitries 940, e.g., for measuring temperature of various components of device 900. In an example, temperature measurement circuitries 940 may be embedded, or coupled or attached to various components, whose temperature are to be measured and monitored. For example, temperature measurement circuitries 940 may measure temperature of (or within) one or more of cores 908*a*, 908*b*, 908*c*, voltage regulator 914, memory 930, a mother-board of SOC 901, and/or any appropriate component of device 900.

In some embodiments, device 900 comprises power measurement circuitries 942, e.g., for measuring power consumed by one or more components of the device 900. In an example, in addition to, or instead of, measuring power, the power measurement circuitries 942 may measure voltage and/or current. In an example, the power measurement circuitries 942 may be embedded, or coupled or attached to various components, whose power, voltage, and/or current consumption are to be measured and monitored. For example, power measurement circuitries 942 may measure power, current and/or voltage supplied by one or more voltage regulators 914, power supplied to SOC 901, power supplied to device 900, power consumed by processor 904 (or any other component) of device 900, etc.

In some embodiments, device 900 comprises one or more voltage regulator circuitries, generally referred to as voltage regulator (VR) 914. VR 914 generates signals at appropriate voltage levels, which may be supplied to operate any appropriate components of the device 900. Merely as an example, VR 914 is illustrated to be supplying signals to processor 904 of device 900. In some embodiments, VR 914 receives one or more Voltage Identification (VID) signals, and generates the voltage signal at an appropriate level, based on the VID signals. Various type of VRs may be utilized for the VR 914. For example, VR 914 may include a "buck" VR, "boost" VR, a combination of buck and boost VRs, low dropout (LDO) regulators, switching DC-DC regulators, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR which is controlled by PCU 910*a/b* and/or PMIC 912. In some embodiments, each core has a network of distributed LDOs to provide efficient control for power management. The LDOs can be digital, analog, or a combination of digital or analog LDOs.

In some embodiments, device 900 comprises one or more clock generator circuitries, generally referred to as clock generator 916. Clock generator 916 generates clock signals at appropriate frequency levels, which may be supplied to any appropriate components of device 900. Merely as an example, clock generator 916 is illustrated to be supplying clock signals to processor 904 of device 900. In some embodiments, clock generator 916 receives one or more Frequency Identification (FID) signals, and generates the clock signals at an appropriate frequency, based on the FID signals.

In some embodiments, device 900 comprises battery 918 supplying power to various components of device 900. Merely as an example, battery 918 is illustrated to be supplying power to processor 904. Although not illustrated in the figures, device 900 may comprise a charging circuitry, e.g., to recharge the battery, based on Alternating Current (AC) power supply received from an AC adapter.

In some embodiments, device 900 comprises Power Control Unit (PCU) 910 (also referred to as Power Management Unit (PMU), Power Controller, etc.). In an example, some sections of PCU 910 may be implemented by one or more processing cores 908, and these sections of PCU 910 are symbolically illustrated using a dotted box and labelled PCU 910*a*. In an example, some other sections of PCU 910 may be implemented outside the processing cores 908, and these sections of PCU 910 are symbolically illustrated using a dotted box and labelled as PCU 910*b*. PCU 910 may implement various power management operations for device 900. PCU 910 may include hardware interfaces, hardware circuitries, connectors, registers, etc., as well as software components (e.g., drivers, protocol stacks), to implement various power management operations for device 900.

In some embodiments, device 900 comprises Power Management Integrated Circuit (PMIC) 912, e.g., to implement various power management operations for device 900. In some embodiments, PMIC 912 is a Reconfigurable Power Management ICs (RPMICs) and/or an IMVP (Intel® Mobile Voltage Positioning). In an example, the PMIC is within an IC chip separate from processor 904. The may implement various power management operations for device 900. PMIC 912 may include hardware interfaces, hardware circuitries, connectors, registers, etc., as well as software components (e.g., drivers, protocol stacks), to implement various power management operations for device 900.

In an example, device 900 comprises one or both PCU 910 or PMIC 912. In an example, any one of PCU 910 or PMIC 912 may be absent in device 900, and hence, these components are illustrated using dotted lines.

Various power management operations of device 900 may be performed by PCU 910, by PMIC 912, or by a combination of PCU 910 and PMIC 912. For example, PCU 910 and/or PMIC 912 may select a power state (e.g., P-state) for various components of device 900. For example, PCU 910 and/or PMIC 912 may select a power state (e.g., in accordance with the ACPI (Advanced Configuration and Power Interface) specification) for various components of device 900. Merely as an example, PCU 910 and/or PMIC 912 may cause various components of the device 900 to transition to a sleep state, to an active state, to an appropriate C state (e.g., CO state, or another appropriate C state, in accordance with the ACPI specification), etc. In an example, PCU 910 and/or PMIC 912 may control a voltage output by VR 914 and/or a frequency of a clock signal output by the clock generator, e.g., by outputting the VID signal and/or the FID signal, respectively. In an example, PCU 910 and/or PMIC 912 may control battery power usage, charging of battery 918, and features related to power saving operation.

The clock generator 916 can comprise a phase locked loop (PLL), frequency locked loop (FLL), or any suitable clock source. In some embodiments, each core of processor 904 has its own clock source. As such, each core can operate at a frequency independent of the frequency of operation of the other core. In some embodiments, PCU 910 and/or PMIC 912 performs adaptive or dynamic frequency scaling or adjustment. For example, clock frequency of a processor core can be increased if the core is not operating at its maximum power consumption threshold or limit. In some embodiments, PCU 910 and/or PMIC 912 determines the operating condition of each core of a processor, and opportunistically adjusts frequency and/or power supply voltage of that core without the core clocking source (e.g., PLL of that core) losing lock when the PCU 910 and/or PMIC 912 determines that the core is operating below a target performance level. For example, if a core is drawing current from a power supply rail less than a total current allocated for that core or processor 904, then PCU 910 and/or PMIC 912 can temporarily increase the power draw for that core or processor 904 (e.g., by increasing clock frequency and/or power supply voltage level) so that the core or processor 904 can perform at a higher performance level. As such, voltage and/or frequency can be increased temporality for processor 904 without violating product reliability.

In an example, PCU 910 and/or PMIC 912 may perform power management operations, e.g., based at least in part on receiving measurements from power measurement circuitries 942, temperature measurement circuitries 940, charge level of battery 918, and/or any other appropriate information that may be used for power management. To that end, PMIC 912 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 910 and/or PMIC 912 in at least one embodiment to allow PCU 910 and/or PMIC 912 to manage processor core energy at least in part based on value(s) detected by one or more of the sensors.

Also illustrated is an example software stack of device 900 (although not all elements of the software stack are illustrated). Merely as an example, processors 904 may execute application programs 950, Operating System 952, one or more Power Management (PM) specific application programs (e.g., generically referred to as PM applications 958), and/or the like. PM applications 958 may also be executed by the PCU 910 and/or PMIC 912. OS 952 may also include one or more PM applications 956a, 956b, 956c. The OS 952 may also include various drivers 954a, 954b, 954c, etc., some of which may be specific for power management purposes. In some embodiments, device 900 may further comprise a Basic Input/Output System (BIOS) 920. BIOS 920 may communicate with OS 952 (e.g., via one or more drivers 954), communicate with processors 904, etc.

For example, one or more of PM applications 958, 956, drivers 954, BIOS 920, etc. may be used to implement power management specific tasks, e.g., to control voltage and/or frequency of various components of device 900, to control wake-up state, sleep state, and/or any other appropriate power state of various components of device 900, control battery power usage, charging of the battery 918, features related to power saving operation, etc.

In various embodiments, device 900 facilitates functionality to adjust the maximum switching frequency of a clock signal input to a feedback comparator of a signal generator of voltage regulation circuitry based on a detected load condition. In an embodiment, the maximum switching frequency of a clock signal input to a feedback comparator of a signal generator of an SCPC is adjusted using either a slow control mode of a fast control mode. In various embodiments, the slow control mode comprises a pulse counting mechanism or a duty cycle detection mechanism. Additionally or alternatively, device 900 facilitates functionality to adjust the frequency of a first clock signal output from a feedback comparator an SCPC based on a detected load condition according to various embodiments. By way of illustration and not limitation, load detecting and frequency adjusting functionality may be provided with one or more of power measurement circuitries 942, power measurement circuitries 942, PMIC 912, PCU 910a, PCU 910b or any other suitable resource of device 900.

In the description herein, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including circuitry to determine a mode of voltage regulation with a SCVR.

Techniques and architectures for determining a regulation of a voltage are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

The following examples pertain to further embodiments. Specifics in the examples may be used anywhere in one or more embodiments. All optional features of the apparatus described herein may also be implemented with respect to a method or process. The examples can be combined in any combinations. For example, example 4 can be combined with example 2.

Example 1. A device comprising: a first comparator to generate a first clock signal based on a reference voltage and a first voltage at an output of a switched-capacitor power converter (SCPC); a second comparator to generate a first control signal based on the first voltage and a threshold voltage; a sensor, coupled to the first comparator, to generate a second control signal based on one of a level of a current of the first clock signal, or a duty cycle of the first clock signal; a frequency divider circuit coupled to receive the first control signal and the second control signal, the frequency divider circuit to generate a second clock signal based on the first control signal and the second control signal; and controller circuitry coupled to the first comparator and the frequency divider circuit, the controller circuitry to operate switch circuitry of the SCPC based on the first clock signal; wherein the frequency divider circuit is to generate the second clock signal further based on a third clock signal, and the first comparator is to generate the first clock signal further based on the second clock signal.

Example 2. The device of example 1, wherein the sensor is to generate the second control signal based on the level of the current of the first clock signal, and the sensor comprises: a pulse counter to generate a pulse count signal based on the first clock signal; and wherein the controller circuitry is further to determine the level of current based on a number of occurrences of the pulse count signal within a particular period of time.

Example 3. The device of example 1, wherein the sensor is to generate the second control signal based on the duty cycle of the first clock signal, and the sensor comprises: timing circuitry to provide an off-time voltage indicative of a length of an off time of the duty cycle of the first clock signal; and a third comparator to receive the off-time voltage and to generate an off-time signal when the off time of the duty cycle of the first clock signal exceeds a threshold time.

Example 4. The device of example 3, wherein the timing circuitry comprises a capacitor, at least one current source to charge the capacitor, and a plurality of first switches to selectively couple the capacitor with the at least one current source.

Example 5. The device of any one of examples 1 to 4, wherein the threshold voltage is one of a first threshold voltage or a second threshold voltage.

Example 6. The device of any one of examples 1 to 5, wherein the second control signal is to select one of two or more divide-by circuitries of the frequency divider circuit to be applied to the third clock signal.

Example 7. The device of any one of examples 1 to 6, wherein the first control signal is to select a bypass circuitry of the frequency divider circuit.

Example 8. A device comprising: a first comparator to generate a first clock signal based on a reference voltage, and on a first voltage at an output of a switched-capacitor power converter (SCPC); a second comparator to generate a first control signal based on the first voltage and a threshold voltage; a sensor, coupled to the first comparator, to generate a second control signal based on one of a level of a current of the first clock signal, or a duty cycle of the first clock signal; a frequency divider circuit coupled to receive the first control signal and the second control signal, the frequency divider circuit to generate a second clock signal based on the first control signal and the second control signal; and controller circuitry coupled to the first comparator and the frequency divider circuit, the controller circuitry to operate switch circuitry of the SCPC based on the first clock signal; wherein the frequency divider circuit is to generate the second clock signal further based on the first clock signal, and wherein the first comparator is to generate the first clock signal further based on a third clock signal.

Example 9. The device of example 8, wherein the sensor is to generate the second control signal based on the level of the current of the first clock signal, and the sensor comprises: a pulse counter to generate a pulse count signal based on the first clock signal; and wherein the controller circuitry is further to determine the level of current based on a number of occurrences of the pulse count signal within a particular period of time.

Example 10. The device of example 8, wherein the sensor is to generate the second control signal based on the duty cycle of the first clock signal, and the sensor comprises: timing circuitry to provide an off-time voltage indicative of a length of an off time of the duty cycle of the first clock signal; and a third comparator to receive the off-time voltage and to generate an off-time signal when the off time of the duty cycle of the first clock signal exceeds a threshold time.

Example 11. The device of example 10, wherein the timing circuitry comprises a capacitor, at least one current source to charge the capacitor, and a plurality of first switches to selectively couple the capacitor with the at least one current source.

Example 12. The device of any one of examples 8 to 11, wherein the threshold voltage is one of a first threshold voltage or a second threshold voltage.

Example 13. The device of any one of examples 8 to 12, wherein the second control signal is to select one of two or more divide-by circuitries of the frequency divider circuit to be applied to the first clock signal; and the first control signal is to select a bypass circuitry of the frequency divider circuit.

Example 14. The device of any one of examples 8 to 13, wherein the sensor is further to generate a third control signal based on one of a level of a current of the first clock signal, or a duty cycle of the first clock signal; and further comprising an interleaving unit coupled to receive the first control signal from the second comparator, the third control signal from the sensor, the second clock signal from the frequency divider circuit, and the third clock signal, wherein the interleaving unit is to generate a fourth clock signal based on the second clock signal, and wherein the controller circuitry coupled to receive the fourth clock signal.

Example 15. A device comprising: a first comparator to generate a first clock signal based on a reference voltage, and on a first voltage at an output of a switched-capacitor power converter (SCPC); a second comparator to generate a first control signal based on the first voltage and a threshold voltage; a sensor, coupled to the first comparator, to generate a second control signal based on the one of a level of a current of the first clock signal, or a duty cycle of the first clock signal; a frequency divider circuit coupled to receive the first control signal and the second control signal, the frequency divider circuit to generate a second clock signal based on the first control signal and the second control signal; and controller circuitry coupled to the first comparator and the frequency divider circuit, the controller circuitry to operate switch circuitry of the SCPC based on the first clock signal; wherein the frequency divider circuit is to generate the second clock signal further based on one of the first clock signal or a third clock signal, and wherein the first comparator is to generate the first clock signal further based on one of the second clock signal or the third clock signal.

Example 16. The device of example 15, wherein the sensor is to generate the second control signal based on the level of the current of the first clock signal, and the sensor comprises: a pulse counter to generate a pulse count signal based on the first clock signal; and wherein the controller circuitry is further to determine the level of current based on a number of occurrences of the pulse count signal within a particular period of time.

Example 17. The device of example 15, wherein the sensor is to generate the second control signal based on the duty cycle of the first clock signal, and the sensor comprises: timing circuitry to provide an off-time voltage indicative of a length of an off time of the duty cycle of the first clock signal; and a third comparator to receive the off-time voltage and to generate an off-time signal when the off time of the duty cycle of the first clock signal exceeds a threshold time.

Example 18. The device of example 17, wherein the timing circuitry comprises a capacitor, at least one current source to charge the capacitor, and a plurality of first switches to selectively couple the capacitor with the at least one current source.

Example 19. The device of any one of examples 15 to 18, wherein the threshold voltage is one of a first threshold voltage or a second threshold voltage.

Example 20. The device of any one of examples 15 to 19, wherein the second control signal is to select one of two or more divide-by circuitries of the frequency divider circuit to be selectively applied to the first clock signal or the third clock signal; and the first control signal is to select a bypass circuitry of the frequency divider circuit.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A device comprising:
a first comparator to generate a first clock signal based on a reference voltage and a first voltage at an output of a switched-capacitor power converter (SCPC);
a second comparator to generate a first control signal based on the first voltage and a threshold voltage;
a sensor, coupled to the first comparator, to generate a second control signal based on one of a level of a current of the first clock signal, or a duty cycle of the first clock signal;
a frequency divider circuit coupled to receive the first control signal and the second control signal, the frequency divider circuit to generate a second clock signal based on the first control signal and the second control signal; and
controller circuitry coupled to the first comparator and the frequency divider circuit, the controller circuitry to operate switch circuitry of the SCPC based on the first clock signal;
wherein the frequency divider circuit is to generate the second clock signal further based on a third clock signal, and the first comparator is to generate the first clock signal further based on the second clock signal.

2. The device of claim 1, wherein the sensor is to generate the second control signal based on the level of the current of the first clock signal, and the sensor comprises:
a pulse counter to generate a pulse count signal based on the first clock signal; and
wherein the controller circuitry is further to determine the level of current based on a number of occurrences of the pulse count signal within a particular period of time.

3. The device of claim 1, wherein the sensor is to generate the second control signal based on the duty cycle of the first clock signal, and the sensor comprises:
timing circuitry to provide an off-time voltage indicative of a length of an off time of the duty cycle of the first clock signal; and
a third comparator to receive the off-time voltage and to generate an off-time signal when the off time of the duty cycle of the first clock signal exceeds a threshold time.

4. The device of claim 3, wherein the timing circuitry comprises a capacitor, at least one current source to charge the capacitor, and a plurality of first switches to selectively couple the capacitor with the at least one current source.

5. The device of claim 1, wherein the threshold voltage is one of a first threshold voltage or a second threshold voltage.

6. The device of claim 1, wherein the second control signal is to select one of two or more divide-by circuitries of the frequency divider circuit to be applied to the third clock signal.

7. The device of claim 1, wherein the first control signal is to select a bypass circuitry of the frequency divider circuit.

8. A device comprising:
a first comparator to generate a first clock signal based on a reference voltage, and on a first voltage at an output of a switched-capacitor power converter (SCPC);
a second comparator to generate a first control signal based on the first voltage and a threshold voltage;
a sensor, coupled to the first comparator, to generate a second control signal based on one of a level of a current of the first clock signal, or a duty cycle of the first clock signal;
a frequency divider circuit coupled to receive the first control signal and the second control signal, the frequency divider circuit to generate a second clock signal based on the first control signal and the second control signal; and
controller circuitry coupled to the first comparator and the frequency divider circuit, the controller circuitry to operate switch circuitry of the SCPC based on the first clock signal;
wherein the frequency divider circuit is to generate the second clock signal further based on the first clock signal, and wherein the first comparator is to generate the first clock signal further based on a third clock signal.

9. The device of claim 8, wherein the sensor is to generate the second control signal based on the level of the current of the first clock signal, and the sensor comprises:
a pulse counter to generate a pulse count signal based on the first clock signal; and
wherein the controller circuitry is further to determine the level of current based on a number of occurrences of the pulse count signal within a particular period of time.

10. The device of claim 8, wherein the sensor is to generate the second control signal based on the duty cycle of the first clock signal, and the sensor comprises:
timing circuitry to provide an off-time voltage indicative of a length of an off time of the duty cycle of the first clock signal; and
a third comparator to receive the off-time voltage and to generate an off-time signal when the off time of the duty cycle of the first clock signal exceeds a threshold time.

11. The device of claim 10, wherein the timing circuitry comprises a capacitor, at least one current source to charge the capacitor, and a plurality of first switches to selectively couple the capacitor with the at least one current source.

12. The device of claim 8, wherein the threshold voltage is one of a first threshold voltage or a second threshold voltage.

13. The device of claim 8, wherein the second control signal is to select one of two or more divide-by circuitries of the frequency divider circuit to be applied to the first clock signal; and the first control signal is to select a bypass circuitry of the frequency divider circuit.

14. The device of claim 8, wherein the sensor is further to generate a third control signal based on one of a level of a current of the first clock signal, or a duty cycle of the first clock signal; and further comprising an interleaving unit coupled to receive the first control signal from the second comparator, the third control signal from the sensor, the second clock signal from the frequency divider circuit, and the third clock signal, wherein the interleaving unit is to generate a fourth clock signal based on the second clock signal, and wherein the controller circuitry coupled to receive the fourth clock signal.

15. A device comprising:

a first comparator to generate a first clock signal based on a reference voltage, and on a first voltage at an output of a switched-capacitor power converter (SCPC);

a second comparator to generate a first control signal based on the first voltage and a threshold voltage;

a sensor, coupled to the first comparator, to generate a second control signal based on the one of a level of a current of the first clock signal, or a duty cycle of the first clock signal;

a frequency divider circuit coupled to receive the first control signal and the second control signal, the frequency divider circuit to generate a second clock signal based on the first control signal and the second control signal; and controller circuitry coupled to the first comparator and the frequency divider circuit, the controller circuitry to operate switch circuitry of the SCPC based on the first clock signal;

wherein the frequency divider circuit is to generate the second clock signal further based on one of the first clock signal or a third clock signal, and wherein the first comparator is to generate the first clock signal further based on one of the second clock signal or the third clock signal.

16. The device of claim 15, wherein the sensor is to generate the second control signal based on the level of the current of the first clock signal, and the sensor comprises:

a pulse counter to generate a pulse count signal based on the first clock signal; and wherein the controller circuitry is further to determine the level of current based on a number of occurrences of the pulse count signal within a particular period of time.

17. The device of claim 15, wherein the sensor is to generate the second control signal based on the duty cycle of the first clock signal, and the sensor comprises:

timing circuitry to provide an off-time voltage indicative of a length of an off time of the duty cycle of the first clock signal; and a third comparator to receive the off-time voltage and to generate an off-time signal when the off time of the duty cycle of the first clock signal exceeds a threshold time.

18. The device of claim 17, wherein the timing circuitry comprises a capacitor, at least one current source to charge the capacitor, and a plurality of first switches to selectively couple the capacitor with the at least one current source.

19. The device of claim 15, wherein the threshold voltage is one of a first threshold voltage or a second threshold voltage.

20. The device of claim 15, wherein the second control signal is to select one of two or more divide-by circuitries of the frequency divider circuit to be selectively applied to the first clock signal or the third clock signal; and the first control signal is to select a bypass circuitry of the frequency divider circuit.

* * * * *